United States Patent
Velev et al.

(10) Patent No.: US 12,114,184 B2
(45) Date of Patent: Oct. 8, 2024

(54) MONITORING QOS PARAMETERS OF A DATA CONNECTION

(71) Applicants: Lenovo (Singapore) PTE. LTD., New Tech Park (SG); Genadi Velev, Darmstadt (DE); Prateek Basu Mallick, Dreieich (DE); Joachim Löhr, Wiesbaden (DE); Apostolis Salkintzis, Athens (GR); Ravi Kuchibotla, Chicago, IL (US)

(72) Inventors: Genadi Velev, Darmstadt (DE); Prateek Basu Mallick, Dreieich (DE); Joachim Löhr, Wiesbaden (DE); Apostolis Salkintzis, Athens (GR); Ravi Kuchibotla, Chicago, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 572 days.

(21) Appl. No.: 17/263,460

(22) PCT Filed: Jul. 26, 2018

(86) PCT No.: PCT/EP2018/070276
§ 371 (c)(1),
(2) Date: Jan. 26, 2021

(87) PCT Pub. No.: WO2020/020461
PCT Pub. Date: Jan. 30, 2020

(65) Prior Publication Data
US 2021/0153048 A1 May 20, 2021

(51) Int. Cl.
*H04W 24/08* (2009.01)
*H04L 43/0852* (2022.01)
(Continued)

(52) U.S. Cl.
CPC ......... *H04W 24/08* (2013.01); *H04L 43/0852* (2013.01); *H04W 24/10* (2013.01);
(Continued)

(58) Field of Classification Search
CPC . H04W 24/08; H04W 24/10; H04W 28/0236; H04W 28/0268; H04W 76/12; H04L 43/0852
See application file for complete search history.

(56) References Cited

U.S. PATENT DOCUMENTS

| | | | |
|---|---|---|---|
| 2010/0125661 A1 | 5/2010 | Perala et al. | |
| 2013/0235747 A1 * | 9/2013 | Le | H04L 45/70 370/252 |

(Continued)

FOREIGN PATENT DOCUMENTS

| | | | | |
|---|---|---|---|---|
| WO | WO-2013067820 A1 * | 5/2013 | ............ | H04W 24/08 |
| WO | WO-2018000379 A1 * | 1/2018 | ............ | H04W 48/18 |

OTHER PUBLICATIONS

PCT/EP2018/070276, "Notification of Transmittal of the International Search Report and the Written Opinion of the International Searching Authority, or the Declaration", PCT ISA, Feb. 22, 2019, pp. 1-19.

(Continued)

*Primary Examiner* — Ayanah S George
(74) *Attorney, Agent, or Firm* — Kunzler Bean & Adamson

(57) ABSTRACT

Apparatuses, methods, and systems are disclosed for monitoring a QoS parameter. One apparatus includes a processor and a transceiver that receives a request to monitor a QoS parameter for a data connection of a remote unit. The processor modifies a downlink packet to include an indication for a QoS monitoring report. The transceiver receives a QoS monitoring result from an access network node in (Continued)

response to delivery of the modified downlink packet and the processor determines a value of the QoS parameter based on delivery information of the downlink packet.

20 Claims, 17 Drawing Sheets

(51) Int. Cl.
    *H04W 24/10*      (2009.01)
    *H04W 28/02*      (2009.01)
    *H04W 76/12*      (2018.01)

(52) U.S. Cl.
    CPC ... *H04W 28/0236* (2013.01); *H04W 28/0268* (2013.01); *H04W 76/12* (2018.02)

(56) References Cited

U.S. PATENT DOCUMENTS

| | | | |
|---|---|---|---|
| 2014/0105044 A1 | 4/2014 | Baillargeon | |
| 2018/0077594 A1 | 3/2018 | He et al. | |
| 2019/0215731 A1* | 7/2019 | Qiao | H04W 24/06 |

OTHER PUBLICATIONS

Huawei et al., "Add indication of Notification Control to QoS rules sent to UE", 3GPP TSG-SA WG2 Meeting #127bis S2-186157, May 28-Jun. 1, 2018, pp. 1-2.
3GPP, "3rd Generation Partnership Project; Technical Specification Group Services and System Aspects; Procedures for the 5G System; Stage 2 (Release 15)", 3GPP TS 23.502 V15.2.0, Jun. 2018, pp. 1-308.
Huawei, Hisilicon, "Solution for KI#3: Enhancements for QoS Monitoring and Control", SA WG2 Meeting #127bis S2-186278, May 28-Jun. 1, 2018, pp. 1-3.
Huawei, Hisilicon, "Solution for QoS Monitoring for URLLC Services", SA WG2 Meeting #128 S2-186945, Jul. 2-6, 2018, pp. 1-4.
3GPP, "3rd Generation Partnership Project; Technical Specification Group Services and System Aspects; System Architecture for the 5G System; Stage 2 (Release 15)", 3GPP TS 23.501 V15.2.0, Jun. 2018, pp. 1-217.
3GPP, "3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725 V0.3.0, Jul. 2018, pp. 1-44.
3GPP, "3rd Generation Partnership Project; Technical Specification Group Radio Access Network; Evolved Universal Terrestrial Radio Access Network (E-UTRAN); X2 interface user plane protocol (Release 15)", 3GPP TS 36.425 V15.0.0, Jun. 2018, pp. 1-17.

* cited by examiner

MONITORING QOS PARAMETERS OF A DATA CONNECTION

FIELD

The subject matter disclosed herein relates generally to wireless communications and more particularly relates to monitoring a QoS parameter.

BACKGROUND

The following abbreviations and acronyms are herewith defined, at least some of which are referred to within the following description.

Third Generation Partnership Project ("3GPP"), Access and Mobility Management Function ("AMF"), Access Network Performance ("ANP"), Access Point Name ("APN"), Access 1o Stratum ("AS"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Public Land Mobile Network ("PLMN"), Quality of Service ("QoS"), Quadrature Phase Shift Keying ("QPSK"), Registration Area ("RA"), Radio Access Network ("RAN"), Radio Access Technology ("RAT"), Radio Resource Control ("RRC"), Receive ("RX"), Switching/Splitting Function ("SSF"), Scheduling Request ("SR"), Serving Gateway ("SGW"), Session Management Function ("SMF"), System Information Block ("SIB"), Tracking Area ("TA"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX").

In fifth generation ("5G") wireless communication systems, QoS requirements for URLLC services include very low latency and very high reliability. This poses some challenges to the 5G system as several factors could affect the QoS performance, such as wireless coverage, 3GPP network node (UPF/RAN/UE) resources, and transport network. While 5GS QoS Notification Control is supported in 5G-AN to monitor the GBR QoS flow status in the 5G-AN, this mechanism only supports Guaranteed Flow Bit Rate ("GFBR") monitoring.

BRIEF SUMMARY

Methods for monitoring a QoS parameter are disclosed. Apparatuses and systems also perform the functions of the methods. One method (e.g., of a user plane network function) for monitoring a QoS parameter includes receiving an instruction to monitor a QoS parameter for a data connection of a remote unit and modifying a downlink packet to include an indication for a packet delivery report. The method includes receiving a packet delivery report in response to delivery of the downlink packet to the remote unit and determining the QoS parameter based on delivery information of the downlink packet.

Another method (e.g., of a user plane network function) for monitoring a QoS parameter includes receiving an instruction to monitor a QoS parameter for a data connection of a remote unit and receiving an indication of a first delay amount for a packet over a radio interface of the remote unit. The method includes determining a second delay amount for the data connection and determining the QoS parameter based on the first and second delay amounts.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
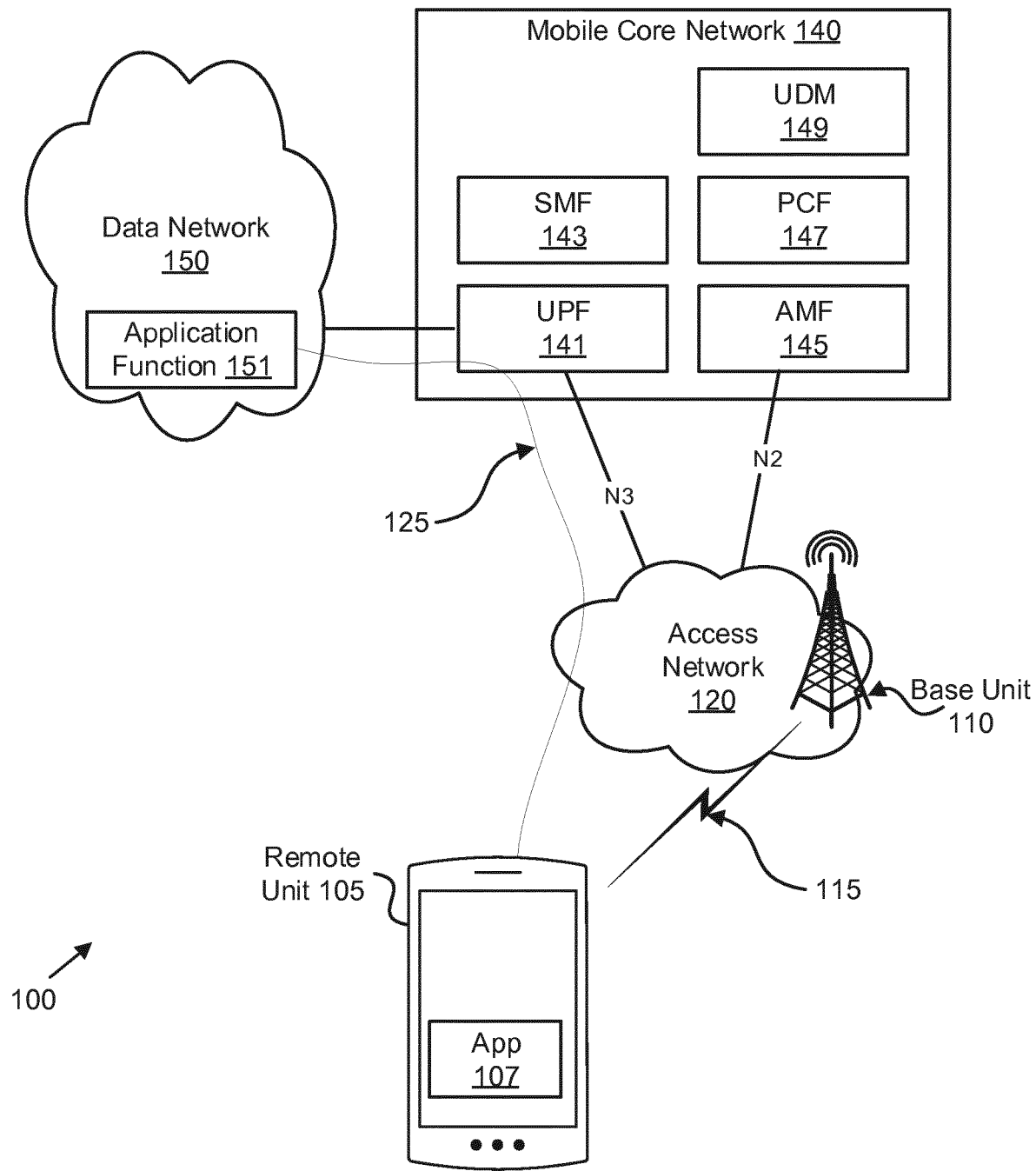
FIG. 1 is a schematic block diagram illustrating one embodiment of a wireless communication system for monitoring a QoS parameter.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for monitoring QoS parameters in uplink and downlink on the user plane path between a UE and a UPF. Data packets (e.g., containing user data) on the user plane are marked and the UPF monitors one or more QoS parameters using the marked data packets.

Please note that the description of the solution use 5GS terminology; however, the concepts described herein are also applicable to EPS (e.g. where the AMF is constituted by MME and UPF is constituted by SGW/PGW) or to UMITS (e.g. where the AMF is constituted by SGSN and UPF is constituted by SGSN/GGSN), etc.

FIG. 1 depicts a wireless communication system 100 for monitoring a QoS parameter, according to embodiments of the disclosure. In one embodiment, the wireless communication system 100 includes at least one remote unit 105, an access network 120 containing at least one base unit 110, wireless communication links 115, and a mobile core network 140. Even though a specific number of remote units 105, access networks 120, base units 110, wireless communication links 115, and mobile core networks 140 are depicted in FIG. 1, one of skill in the art will recognize that any number of remote units 105, access networks 120, base units 110, wireless communication links 115, and mobile core networks 140 may be included in the wireless communication system 100. In another embodiment, the access network 120 contains one or more WLAN (e.g., Wi-Fi™) access points.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

In some embodiments, the remote units 105 may communicate with a remote server, such as the application function ("AF") 151, via a data path 125 that passes through the mobile core network 140 and a data network 150. For example, a remote unit 105 may establish a PDU connection (or a data connection) to the data network 150 via the mobile core network 140 and the access network 120. The mobile core network 140 then relays traffic between the remote unit 105 and the AF 151 using the PDU connection to the data network 150. Note that an application 107 may communicate with the AF 151 using a PDU session, or similar data connection.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 140 via the access network 120. The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a data network 150, like the Internet and private data networks, among other data networks. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple control plane functions including, but not limited to, an Access and Mobility Management Function ("AMF") 145, a Session Management Function ("SMF") 143, and a Policy Control Function ("PCF") 147. Additionally, the mobile core network 140 includes a user plane function ("UPF") 141 and a Unified Data Management ("UDM") 149. Although specific numbers and types of network functions are depicted in FIG. 1, one of skill in the art will recognize that any number and type of network functions may be included in the mobile core network 140. In some embodiments, the mobile core network 140 may include multiple network slices. In such embodiments, each slice may include one or more network functions ("NFs"), such as user plane functions ("UPF") and/or control plane functions, such as a SMFs and the like.

To support data connections (e.g. PDU Sessions) having low latency GBR (e.g., per QoS flows or URLLC requirements) QoS monitoring is performed on the user plane path between the remote unit 105 (e.g., the UE) and the UPF 141. While in some instances a QoS parameters for the downlink and for the uplink may be the same, measuring the QoS parameters in the downlink does not automatically mean that the actual uplink QoS parameters are the same. To support low latency GBR, independent measurements of uplink QoS parameters and downlink QoS parameters is performed on the user plane path. However, where the system 100 is implemented in such way that fulfillment of QoS parameters in one transmission direction (e.g. downlink) would guarantee the fulfillment of QoS parameters in the other transmission direction (e.g. uplink), then the mobile core network 140 (e.g., SMF 143) may setup the QoS monitoring in a single direction only (e.g. in downlink only).

As discussed in further detail below, the UPF 141 monitors the QoS parameters in uplink and downlink between the remote unit 105 and UPF 141, where the QoS parameters apply to the IP datagram, i.e. including the whole transmission path between the SDAP/PDCP layer in the remote unit and the stack for the N6 interface of the UPF 141. In general, QoS parameters monitoring is maintained in the user plane entity terminating the N6 interface in the core network (e.g. the anchor UPF). Further, user plane packets carrying user data (e.g., IP datagram) are marked to perform QoS measurements. In one embodiment, all user plane packets are marked for QoS measurement. In another embodiment, only certain packets (e.g. every $2^{nd}$ or every $10^{th}$ packets) can be marked for QoS measurement. Where only certain packets are marked, the packets to mark are denoted by a "marking pattern," also referred to herein as just "pattern."

Beneficially, by marking the user data packets, the actual transmission delay of user data (e.g., 1000 octets long) is measured. In certain embodiments, special packets not carrying user data (e.g. signaling Echo packets between the remote unit 105 and the UPF 141) may be used for QoS measurement; however, the transmission delay of such packets, especially over the radio link Uu interface, may be different than that experienced by user data packets, e.g., having shorter delay due to the smaller sized of an Echo packet, and thus, the QoS measurement would not be accurate.

In various embodiments, the SMF 143 initiates QoS measurements on the user plane path. Here, the SMF 143 may configure the UPF 141, the base unit 110, and/or the remote unit 105 to gather the actual QoS parameter measurements on the whole path between the remote unit 105 and the UPF anchor (e.g., the UPF 141). In certain embodiments, the mobile core network 140 may inform customers (e.g. $3^{rd}$ party application providers of AF 151) about the actual QoS conditions. This may be a new feature of the network to expose to customers.

Moreover, the mobile core network 140 (e.g. SMF 143) may also detect if the actual QoS parameters are improved compared to the QoS parameters used for the QoS flow. If so, then the mobile core network 140 may offer improved connection quality to the customers (e.g.,$3^{rd}$ party application providers of the AF 151).

Figure 2:
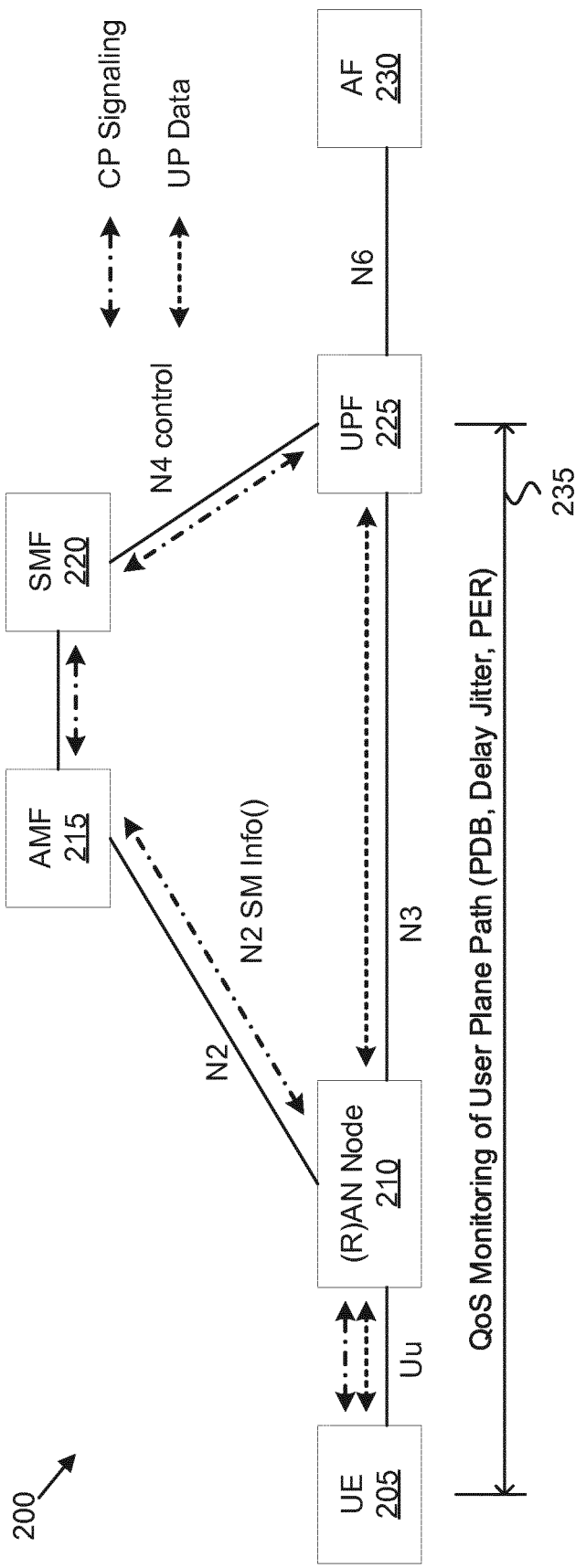
FIG. 2 is a block diagram illustrating one embodiment of a network architecture for monitoring a QoS parameter.

FIG. 2 depicts a network architecture 200 used for monitoring a QoS parameter, according to embodiments of the disclosure. The network architecture 200 may be a simplified embodiment of the wireless communication system 100. As depicted, the network architecture 200 includes a UE 205, a (R)AN node 210, an AMF 215, a SMF 220, a UPF 225, and an AF 230. The UE 205 may be one embodiment of the remote unit 105 described above. The (R)AN node 210 may be one embodiment of the base unit 110 described above. One example of a (R)AN node 210 is a gNB. Another example is a WLAN access point or node terminating N2/N3 interfaces like N3IWF. The AMF 215, SMF 220, UPF 225, and AF 230 may be embodiments of the AMF 145, SMF 143, UPF 141, and AF 151, respectively.

The user plane path depicted in FIG. 2 is composed on the Uu interface (e.g., the path between the UE 205 and the (R)AN node 210) and the N3 interface (e.g., the path between the (R)AN node 210 and the UPF 225). The UPF 225 and (R)AN node 210 exchange GTP-U PDUs over the N3 interface. Note that in FIG. 2, there is no intermediate UPF (uplink classifier, UL-CL, or branching point) introducing an additional N9 interface. However, where an N9 interface is present, the same principles apply. In such a scenario, the anchor UPF (terminating the N6 interface) considers the delay over both the N3 interface and over the N9 interface, in addition to the delay over the radio interface.

Figure 10:
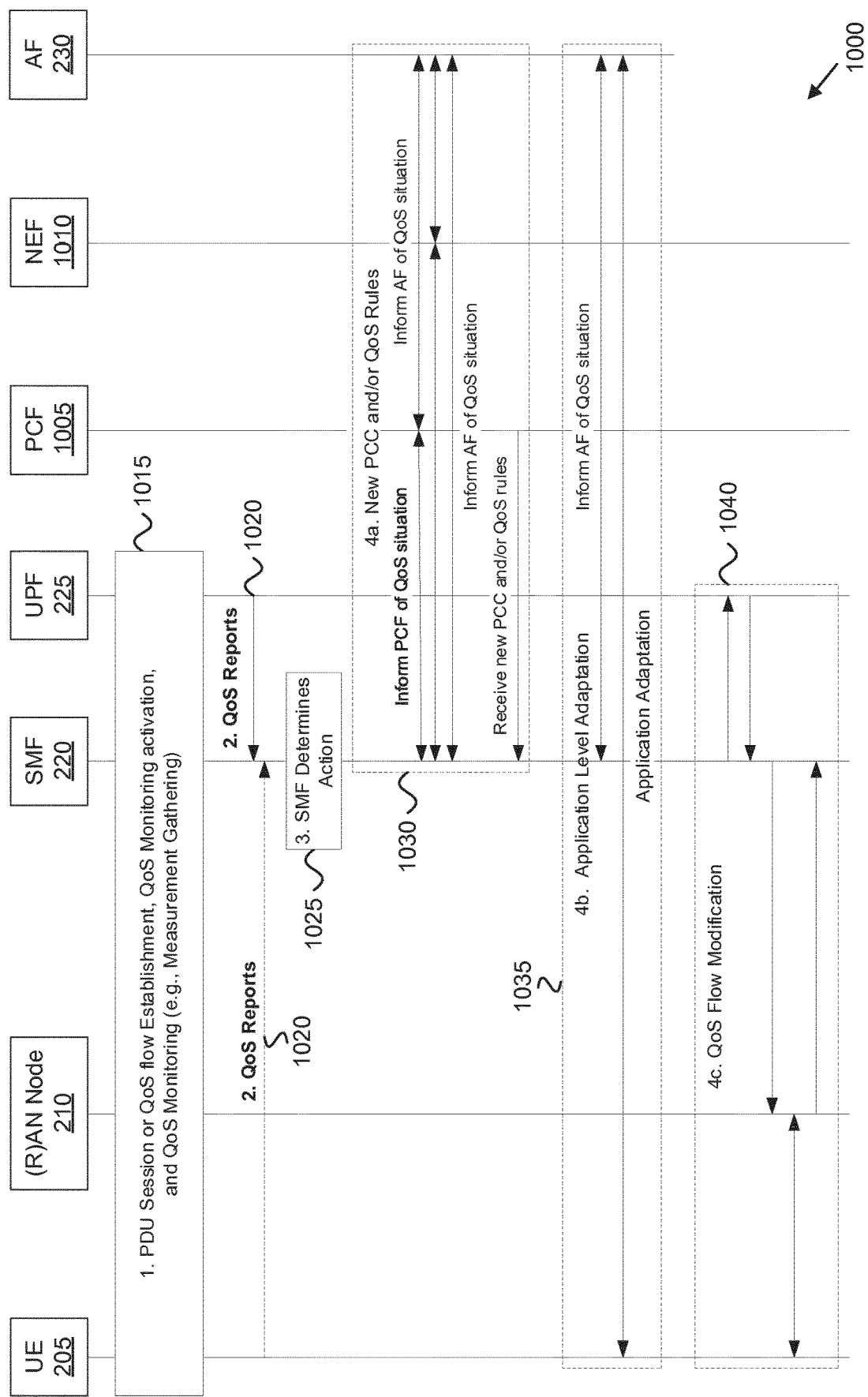
FIG. 10 is a block diagram illustrating one embodiment of a procedure for monitoring a QoS parameter.

The SMF 220 configures at least the UPF 225 and the (R)AN node 210 to monitor one or more QoS parameters on the uplink and/or downlink 235. Examples of QoS parameters to be monitored on the user plane path include packet delay budget ("PDB"), delay jitter, packet error rate ("PER"), and the like. In various embodiments, the UPF 225 generates a QoS report and sends it to the SMF 220. In a further aspect of the disclosure, FIG. 10 shows how the QoS monitoring report can be used at the SMF. After receiving the QoS reports from the UPF, the SMF may take actions on its own, but can also report to other entities or network functions about the changed QoS conditions.

Figure 3:
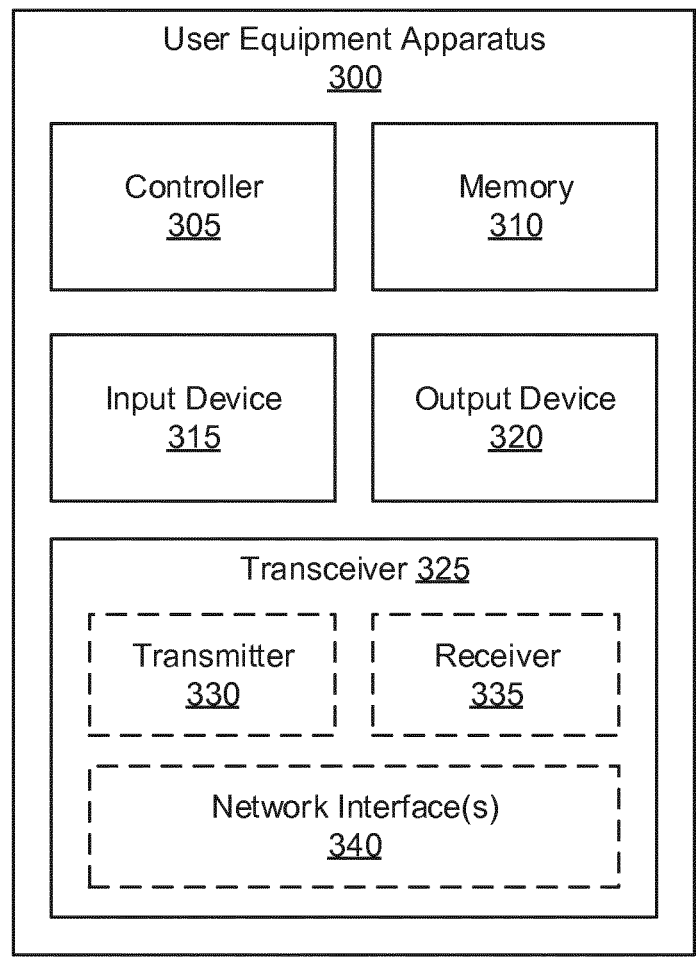
FIG. 3 is a schematic block diagram illustrating one embodiment of a user equipment apparatus for monitoring a QoS parameter.

FIG. 3 depicts one embodiment of a user equipment apparatus 300 that may be used for monitoring a QoS parameter, according to embodiments of the disclosure. The user equipment apparatus 300 may be one embodiment of the remote unit 105. Furthermore, the user equipment apparatus 300 may include a processor 305, a memory 310, an input device 315, an output device 320, and a transceiver 325. In some embodiments, the input device 315 and the output device 320 are combined into a single device, such as a touch screen. In certain embodiments, the user equipment apparatus 300 does not include any input device 315 and/or output device 320.

As depicted, the transceiver 325 includes at least one transmitter 330 and at least one receiver 335. Additionally, the transceiver 325 may support at least one network interface 340. Here, the at least one network interface 340 facilitates communication with an eNB or gNB (e.g., using the "Uu" interface). Additionally, the at least one network interface 340 may include an interface used for communications with an UPF, an SMF, and/or a P-CSCF.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In various embodiments, the processor 305 receives (e.g., via the transceiver 325) an instruction to monitor a QoS parameter for a data connection of the user equipment apparatus 300 and identifies an uplink packet according to a QoS measurement rule. The processor 305 marks the uplink packet with a time-stamp and transmits (e.g., via the transceiver 325) the marked uplink packet.

In certain embodiments, the processor 305 requests the data connection prior to receiving the instruction to monitor a QoS parameter. For example, the processor 305 may control the transceiver 325 to send a PDU Session Establishment Request message to the mobile communication network. In such embodiments, the instruction to monitor a QoS parameter may be received in received in a response message establishing the data connection. In one example, the instruction to monitor a QoS parameter may be included in a PDU Session Establishment Accept message. In further embodiments, the response message (e.g., PDU Session Establishment Accept message) may include one or more QoS measurement rules.

In various embodiments, the time-stamp may be one of: a global time-stamp, a radio frame sequence number, and a subframe number. In some embodiments, the processor 305 receives (e.g., via the transceiver 325) a time-stamped downlink packet and calculates a downlink delay based on the time-stamped downlink packet. Moreover, the processor 305 may transmit (e.g., via the transceiver 325) the downlink delay in a QoS monitoring report. In one embodiment, transmitting the downlink delay in a QoS monitoring report occurs according to a configured periodicity. In some embodiments, receiving the instruction to monitor the QoS parameter includes receiving a marking pattern, wherein modifying the uplink packet occurs according to a frequency indicated by the marking pattern. In one example, the marking pattern may be included in the PDU Session Establishment Accept message.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to monitoring a QoS parameter, for example storing QoS Rules, monitoring configurations, time-stamps, and the like. In certain embodiments, the memory 310 also stores program code and related data, such as an operating system ("OS") or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, all or portions of the output device 320 may be located near the input device 315.

The transceiver 325 communicates with one or more network functions of a mobile communication network. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages. The transceiver 325 may include one or more transmitters 330 and one or more receivers 335.

Figure 4:
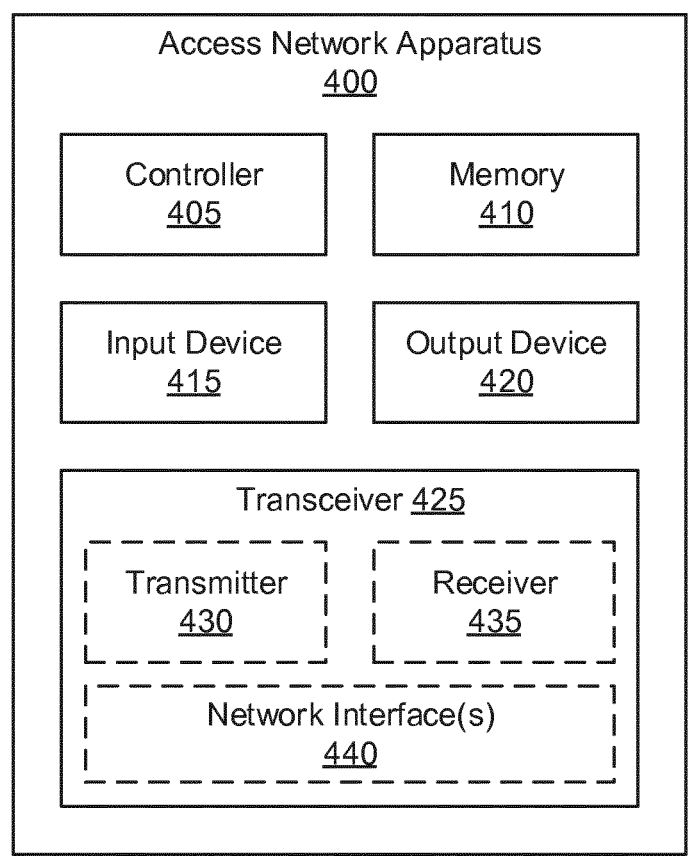
FIG. 4 is a schematic block diagram illustrating one embodiment of an access network apparatus for monitoring a QoS parameter.

FIG. 4 depicts one embodiment of a network equipment apparatus 400 that may be used for monitoring a QoS parameter, according to embodiments of the disclosure. In some embodiments, the network equipment apparatus 400 may be one embodiment of the UPF 141 and/or UPF 225. In other embodiments, the network equipment apparatus 400 may be one embodiment of the SMF 143 and/or SMF 220.

Furthermore, the network equipment apparatus 400 may include a processor 405, a memory 410, an input device 415, an output device 420, and a transceiver 425. In some embodiments, the input device 415 and the output device 420 are combined into a single device, such as a touchscreen. In certain embodiments, the network equipment apparatus 400 may not include any input device 415 and/or output device 420.

As depicted, the transceiver 425 includes at least one transmitter 430 and at least one receiver 435. Additionally, the transceiver 425 may support at least one network interface 440, such as an "N3" interface used for communications between a user plane function (e.g., the UPF 147 and/or UPF 225) and an access network node (e.g., the base unit 110 and/or (R)AN node 210), an "N4" interface used for communications between a session management function (e.g., the SMF 146) and a UPF, an "N6" interface used for communications between a UPF and an application function, and the like.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the network equipment apparatus 400 functions as a user plane function in the mobile communication network. Where the network equipment apparatus 400 operates as a UPF, the processor 405 receives an instruction to monitor a QoS parameter for a data connection of the remote unit and modifies a downlink packet to include an indication for a packet delivery report. The processor 405 also receives a packet delivery report (e.g., via the transceiver 425) in response to delivery of the downlink packet to the remote unit.

The processor 405 determines the QoS parameter based on delivery information for the downlink packet. In one embodiment, the delivery information is the receipt of a delivery report for the marked DL packet as well as delay information for the delivered packet. In another embodiment, no delivery report may be received within a threshold time, thus the delivery information may be the determination of unsuccessful delivery of the DL packet. In various embodiments, the QoS parameter may a downlink QoS parameter, such as a downlink packet delay budget, a downlink delay jitter, and/or a downlink packet error rate.

In some embodiments, receiving the instruction to monitor the QoS parameter includes receiving a marking pattern. In such embodiments, modifying the downlink packet occurs according to the marking pattern. In some embodiments, modifying the downlink packet to include the indication for a packet delivery report includes adding the indication to an encapsulation header of the downlink packet.

In some embodiments, the instruction to monitor the QoS parameter indicates at least a specific data connection and one or more QoS parameters to be monitored. In certain embodiments, indicating the specific data connection includes the instruction indicating a specific data flow associated with that data connection. In one embodiment, the specific data flow is a QoS flow (e.g., of a specific PDU Session). In another embodiment, the specific data flow is a bearer, such as an EPS bearer.

In some embodiments, receiving the packet delivery report includes the transceiver 425 receiving the packet delivery report from an access network node in a user plane path of the data connection. In one embodiment, the access network node sends the packet delivery report immediately after successful transmission of the downlink packet.

In certain embodiments, the transceiver 425 sends the downlink packet to the access network node, wherein the processor 405 initiates a timer in response to sending the downlink packet to the access network node and stops the timer in response to receipt of the packet delivery report. In one such embodiment, the processor 405 may determine the QoS parameter based on an amount of time measured by the timer.

In other embodiments, the transceiver 425 sends the downlink packet to the access network node, wherein the processor 405 records a first local time when the downlink packet is send and records a second local time when the delivery report is received. In one such embodiment, the processor 405 may determine the QoS parameter based on a comparison of the recorded first and second local times.

In certain embodiments, the processor 405 may determine non-delivery of the downlink packet, e.g., in response to expiry of the timer prior to receiving a packet delivery report for the downlink packet. In such embodiments, determining the QoS parameter may be based on the non-delivery of the downlink packet.

In certain embodiments, the instruction to monitor the QoS parameter is received from a session management function. Here, the processor 405 may report the QoS parameter to the session management function. In such embodiments, the instruction to monitor the QoS parameter may indicate a specific type of QoS report format from a plurality of QoS report formats. In one embodiment, the QoS report may indicate a type and a location of a communication error, e.g., in the data connection.

In some embodiments, modifying the downlink packet includes the processor 405 adding a global time-stamp in the downlink packet, wherein the packet delivery report includes a downlink delay based on the global time-stamp.

In various embodiments, the network equipment apparatus 400, while acting as a user plane function, receives an instruction to monitor a QoS parameter for a data connection of a remote unit, for example via the transceiver 425, and receives an indication of a first delay amount for a packet over a radio interface of the remote unit. The processor 405 determines a second delay amount for the data connection and determines the QoS parameter based on the first and second delay amounts. Here, the QoS parameter may be one or more of: an uplink packet delay budget, an uplink delay jitter, and an uplink packet error rate.

In certain embodiments, receiving the instruction to monitor the QoS parameter includes receiving a target value for the QoS parameter. In such embodiments, determining the QoS parameter may include the processor 405 comparing a measured value of the QoS parameter to the target value. Here, the processor 405 may determine a packet-error-rate for the QoS parameter, e.g., a ratio (or percentage) of packets that fail to meet the target QoS parameter. In various embodiments, determining the QoS parameter based on the first and second delay amounts includes determining an amount of delay based on a time-stamped uplink packet.

In some embodiments, the instruction to monitor the QoS parameter indicates at least a specific data connection and one or more QoS parameters to be monitored. In certain embodiments, indicating the specific data connection includes the instruction indicating a specific data flow associated with that data connection. In one embodiment, the specific data flow is a QoS flow. In another embodiment, the specific data flow is a bearer, such as an EPS bearer.

In some embodiments, determining the second delay amount includes the transceiver 425 sending a GTP-U echo request message to an access network node in a user plane path of the data connection. In certain embodiments, the indication of a first delay amount is received at a first periodicity and the GTP-U echo request is sent according to a second periodicity that is greater than the first periodicity. In one embodiment, the first periodicity may be indicated by a marking pattern received with the instruction to measure the QoS parameter. In certain embodiments, determining the second delay amount occurs in response to a measured packet delay budget exceeding a target packet delay budget.

In some embodiments, receiving the indication of a first delay amount includes receiving an uplink radio transmission delay time in an uplink packet header. In certain embodiments, the second delay amount includes the delay amount of an access-network-to-core-network path. In one embodiment, the access-network-to-core-network path comprises an N3 user place interface. In certain embodiments, the second delay amount includes the delay amount of an intra-core-network path. In one embodiment, the intra-core-network comprises an N9 interface.

In certain embodiments, the processor 405 measures the second delay in response to a trigger event. One example of a trigger event is the measured UL PDB exceeding a target PDB (e.g., by a predefined percentage or margin). In some embodiments, the processor 405 further measures a downlink QoS parameter independently of the first and second delay amounts.

In various embodiments, the network equipment apparatus 400 functions as a session management function in the mobile communication network. Where the network equipment apparatus 400 operates as a SMF, the transceiver 425 receives, from a remote unit, a request to establish a data connection and the processor 405 determines to monitor QoS parameter for the requested data connection. The processor 405 configures a network function and an access network node to execute the monitoring of the QoS parameter for the data connection of a remote unit and the transceiver 425 receives a QoS report from the configured network function.

In some embodiments, the processor 405 detects a changed QoS condition based on the QoS report and performs one of: QoS flow modification, identifying new QoS policy rules, and informing an application server of the changed QoS condition. Moreover, the QoS parameter may be one or more of: an uplink packet delay budget, an uplink delay jitter, an uplink packet error rate, a downlink packet delay budget, a downlink delay jitter, and a downlink packet error rate.

In some embodiments, configuring a network function and an access network node to monitor the QoS parameter for a data connection of a remote unit includes indicating whether to measure one of: an uplink QoS parameter and a downlink QoS parameter. In certain embodiments, the transceiver 425 may receive an indication from the remote unit as to whether the remote unit is capable of monitoring the uplink QoS parameter. In further embodiments, the processor 405 may configure the remote unit to execute the monitoring of the QoS parameter for the requested data connection.

In some embodiments, determining to monitor the QoS parameter for the requested data connection may include one or more of: downloading subscription data of the remote unit, requesting policy rules for the requested data connection, and determining application level requirements. In certain embodiments, configuring the network function and access network node to monitor the QoS parameter includes configuring a frequency for marking data packets, wherein the QoS parameter is measured using the marked data packets.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to monitoring a QoS parameter, for example storing QoS Rules, monitoring configurations, time-stamps, and the like. In certain embodiments, the memory 410 also stores program code and related data, such as an operating system ("OS") or other controller algorithms operating on the network equipment apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

The transceiver 425 communicates with one or more access network nodes and/or with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with network functions in a mobile core network.

Figure 5:
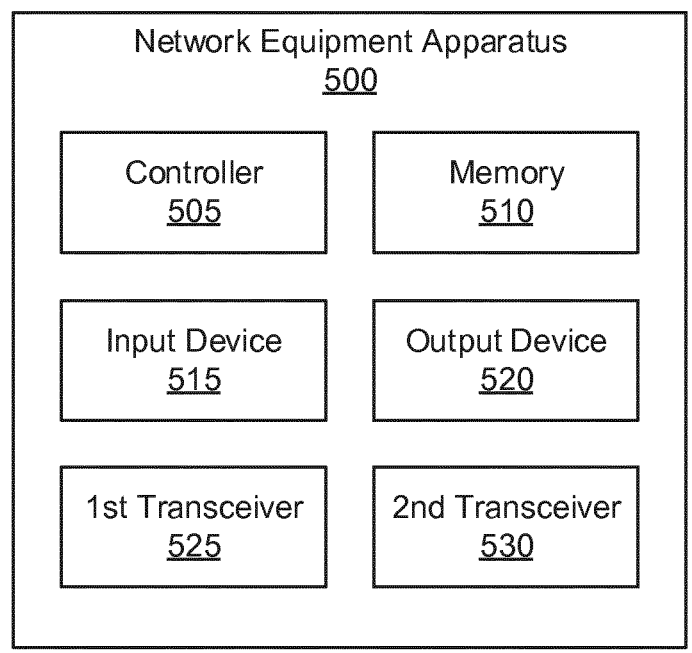
FIG. 5 is a schematic block diagram illustrating one embodiment of a network equipment apparatus for monitoring a QoS parameter.

FIG. 5 depicts one embodiment of an access network apparatus 500 that may be used for monitoring a QoS parameter, according to embodiments of the disclosure. In some embodiments, the access network apparatus 500 may be one embodiment of the base unit 110 and/or (R)AN node 210. Furthermore, the access network apparatus 500 may include a processor 505, a memory 510, an input device 515, an output device 520, a first transceiver 525, and a second transceiver 530. In some embodiments, the input device 515 and the output device 520 are combined into a single device, such as a touchscreen. In certain embodiments, the network equipment apparatus 500 may not include any input device 515 and/or output device 520.

The first transceiver 525 communicates with one or more remote units (e.g., using radio), while the second transceiver 530 communicates with one or more network functions in a core network (e.g., the mobile core network 140). Each transceiver 525, 530 may include at least one transmitter and at least one receiver. Additionally, the transceivers 525, 530 may support at least one network interface, such as an "Uu" interface used for communications between a remote unit 105 and the access network apparatus 500.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, the first transceiver 525, and the second transceiver 530.

In various embodiments, the processor 505 receives (e.g., via the second transceiver 530) an instruction to monitor a QoS parameter for a data connection of a remote unit and indicates QoS measurement rules to the remote unit (e.g., via the first transceiver 525). The processor 505 receives (e.g., via the first transceiver 525) a marked uplink packet from the remote unit and determines a first delay amount for a radio interface of the remote unit from the marked uplink packet.

In some embodiments, the marked uplink packet includes a time-stamp. In such embodiments, the processor 505 determines the first delay amount for a radio interface based on the time-stamp. In certain embodiments, the time-stamp is a global time-stamp. In such embodiments, the processor 505 forwards (e.g., via the second transceiver 530) the global time-stamp to a user plane function in a user plane path of the data connection. In other embodiments, the time-stamp is a system time of the access network node. In such embodiments, the system time may be one of: a radio frame sequence number and a subframe number.

In some embodiments, receiving the instruction to monitor the QoS parameter includes receiving a marking pattern. In such embodiments, the marked uplink packet is received according to the marking pattern. In various embodiments, the QoS parameter includes one of: an uplink packet delay budget, an uplink delay jitter, and an uplink packet error rate.

In various embodiments, the processor 505 receives (e.g., via the first transceiver 525) an instruction to monitor a QoS parameter for a data connection of a remote unit and receives (e.g., via the first transceiver 525) a marked downlink packet for the remote unit from a user plane function. The processor 505 measures a downlink transmission delay for the downlink packet and transmits (e.g., via the first transceiver 525) a packet delivery report to the user plane function, the packet delivery report indicating the measured downlink transmission delay.

In some embodiments, the marked uplink packet includes a time-stamp, the method further including transmitting the time-stamp in one of: a PDCP header and a SDAP header. In certain embodiments, the time-stamp is a global time-stamp.

In various embodiments, the QoS parameter includes one of: a downlink packet delay budget, a downlink delay jitter, and a downlink packet error rate.

In one embodiment, transmitting the packet delivery report to the user plane function includes appending the packet delivery report to an uplink data packet received from the remote unit. In another embodiment, transmitting the packet delivery report to the user plane function includes sending a GTP-U message to the user plane function. In certain embodiments, the packet delivery report is included in a GTP-U encapsulation header.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to monitoring a QoS parameter, for example storing QoS Rules, monitoring configurations, time-stamps, and the like. In certain embodiments, the memory 510 also stores program code and related data, such as an operating system ("OS") or other controller algorithms operating on the network equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the first transceiver 525 communicates with one or more remote units, while the second transceiver 530 communicates with the mobile core network. The transceivers 525 and 530 operate under the control of the processor 505 to transmit messages, data, and other signals and also to receive messages, data, and other signals. For example, the processor 505 may selectively activate one or both of the transceivers 525, 530 (or portions thereof) at particular times in order to send and receive messages. The first transceiver 525 may include one or more transmitters and one or more receivers for communicating with the remote unit over the access network. Similarly, the second transceiver 530 may include one or more transmitters and one or more receivers for communicating with the core network. As discussed above, the first transceiver 525 and the second transceiver 530 may support one or more the network interfaces for communicating with the mobile communication network.

Figure 6:
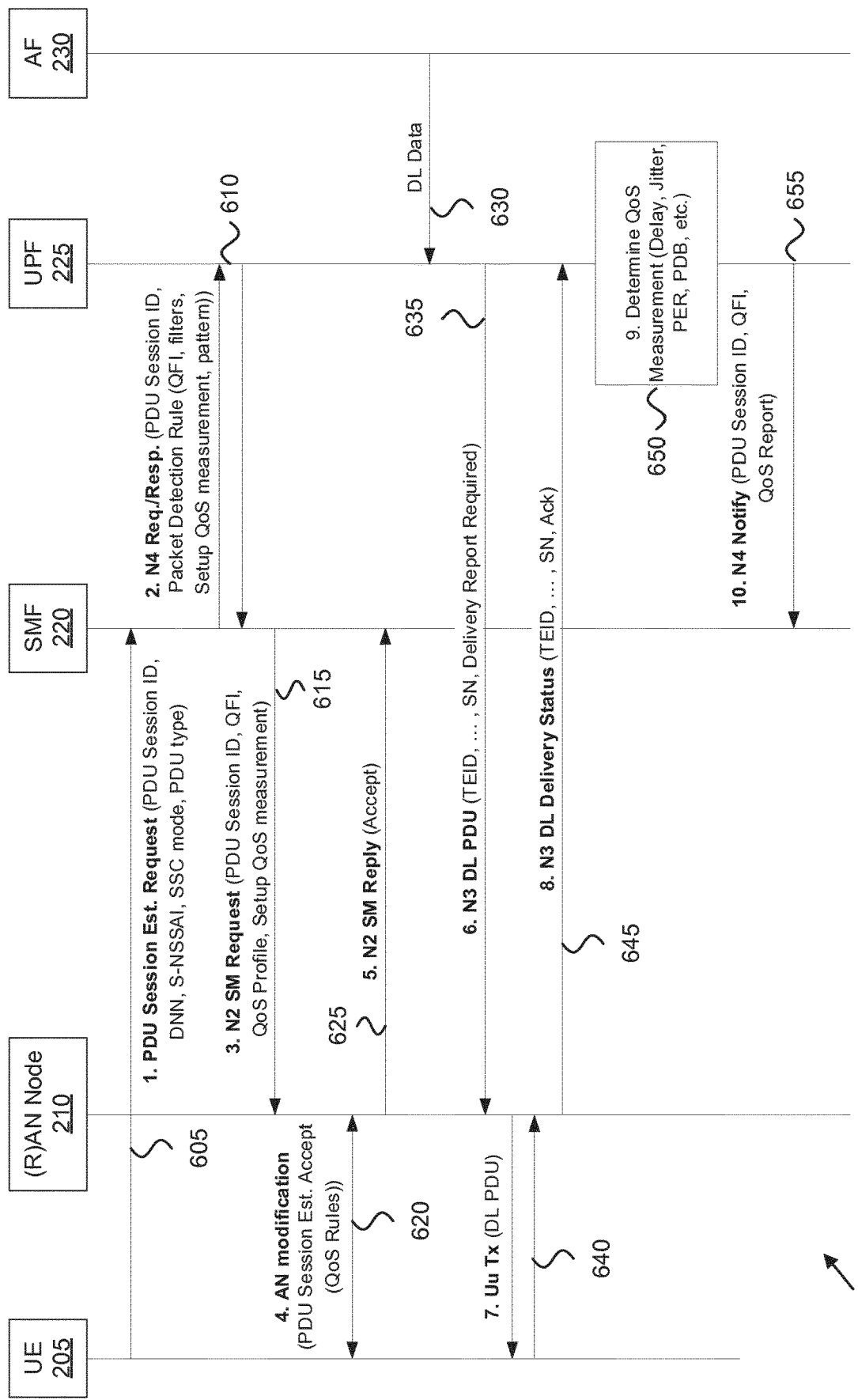
FIG. 6 is a block diagram illustrating one embodiment of a first procedure for monitoring a QoS parameter.

FIG. 6 depicts a first network procedure 600 for monitoring a QoS parameter, according to embodiments of the disclosure. The first network procedure 600 involves the UE 205, (R)AN node 210, SMF 220, UPF 225, and AF 230. The first network procedure 600 may be used to measure actual DL QoS characteristics of a QoS flow is to perform hop-by hop measurements. Note that the UE 205 is not directly involved in the QoS measurement; rather the (R)AN node 210 calculates and reports the needed measurement data back to the UPF 225. For example, the UPF 225 may request (e.g. using a specific parameter, indication or flag in the downlink N3 tunnel data PDU) the (R)AN node 210 to report immediately after the DL packet transmission a "DL delivery status" for each packet to which the flag has been setup by the UPF 225.

The first network procedure 600 begins with the UE 205 requesting a PDU Session, e.g., sending to the SMF 220 (over AMF) a PDU Session Establishment Request message (see signaling 605). Here, the PDU Session Establishment Request includes a PDU Session ID, a DNN, a S-NSSAI, an SSC mode, and a PDU type. In certain embodiments, the PDU Session Establishment Request may include a 5GSM Core Network Capability. Note that the PDU Session Establishment Request message may be encapsulated in a NAS N1 SM message.

Upon reception of the PDU Session Establishment Request message, the SMF 220 may download (e.g., from the UDM 149) subscription data of the UE 205 for the requested DNN and/or S-NSSAI. Additionally, the SMF 220 may send a request (e.g., to the PCF 147) for policy rules for this PDU Session. Accordingly, the SMF 220 determines that QoS monitoring (e.g., QoS measurement) needs to be applied to one or more of the data flows (e.g., QoS flows) for this PDU Session. The determination can be done either based on preconfiguration (network configuration) in the SMF 220 for the DNN and/or S-NSSAI; or based on indication or policy rules received from the PCF; or based on indication received from the UDM/UDR; or the SMF 220 may directly exchange signaling with the AF 230 (e.g., an application server ("AS")) to determine the application level requirements. Additionally, if the SMF determines that the QoS parameters for one or more QoS flows for this PDU Session require QoS parameter monitoring (e.g. if the QoS flow is for URLLC service), the SMF 220 may consider whether an UPF is capable of QoS monitoring during the UPF selection procedure (FIG. 6 assumes that the SMF 220 selects the UPF 225 which is capable of QoS monitoring).

To implement the QoS monitoring, the SMF 220 sends to the UPF 225 (e.g., via the N4 interface) a request message with packet detection rules (e.g., per QFI) to the selected UPF 225 and additionally indicates to the UPF 225 to setup corresponding mechanism(s) for QoS measurement (see signaling 610). The SMF 220 may additionally indicate whether the QoS monitoring applies a) to downlink only, b) to uplink only, or c) to both downlink and uplink. In various embodiments, the indication to setup corresponding QoS monitoring mechanism of UL and/or DL monitoring can be implemented in various ways: e.g. either 1) for each QoS flow to be monitored (e.g., the indication "QoS monitoring required" is sent for the QFI to be monitored), or 2) the QoS monitoring required indication is always included and it can have two values, e.g. 'ON' (or 'activate') or 'OFF (or 'deactivate') value. In various embodiments, the "QoS flow" may refer to a specific bearer (e.g., an EPS bearer).

In certain embodiments, the SMF 220 may configure the frequency for performing the QoS measurement in the user plane, for example by sending a marking pattern. In one example, the marking pattern may indicate that the measurement is performed for each $5^{th}$ packet, $10^{th}$ packet, etc. Additionally, the SMF 220 may configure a particular QoS parameter to measure. As a non-limiting example, the QoS parameters to measure can be at least (1) delay or PDB for downlink data, (2) delay jitter and/or (3) packet error rate ("PER").

In some embodiments, the UPF 225 acknowledges to the SMF 220 whether the QoS monitoring is accepted and/or whether the UPF 225 is able to apply the QoS monitoring (QoS measurement). Note that if a UPF indicates it is not able to apply the QoS monitoring, then the SMF 220 may select another UPF or perform other actions (e.g. report to PCF or AF that the QoS monitoring cannot be activated and optionally whether it cannot be activated only temporarily or generally for this traffic flow).

Additionally, the SMF 220 configures the (R)AN node 210 for monitoring QoS parameter(s) by sending a "Setup QoS measurement" (or e.g. QoS monitoring required or other appropriate indication name) indication (see signaling 615). In the depicted embodiment, the SMF 220 sends a N2 SM request that includes the PDU Session ID, QFI(s), QoS Profile(s), CN Tunnel Info, S-NSSAI from the Allowed NSSAI, Session-AMBR, PDU Session Type, User Plane Policy Enforcement, the Setup QoS measurement indication and N1 SM container (PDU Session Establishment Accept message). Note the coding of the Setup QoS measurement indication can be similar to the coding of the QoS monitoring required indication in the signaling from SMF to UPF. Accordingly, the Setup QoS measurement indication may be used in the (R)AN node 210 to prepare for the reception of marked downlink GTP-U packets for reporting. In addition, in one embodiment, during RRC (re)Configuration procedure the DL data delivery reporting can be setup as well. The configuration may include applicable rules dictating which packets contain the time-stamp.

Additionally, the (R)AN node 210 and UE 205 perform the establishment (or modification) of access network ("AN") resources (see signaling 620). In the depicted embodiment, the (R)AN node 210 sends an AN modification message that includes DRB establishment for the PDU Session (or QoS flow) indicated in the N2 SM request. Note that the AN modification message includes QoS rules for the PDU Session.

In various embodiments, the (R)AN node 210 replies to the SMF 220 that the requested QoS profile is acceptable (see signaling 625). Note that if a (R)AN node is not capable of QoS measurements, then the (R)AN node indicates this to the SMF 220. In such a situation (e.g., the (R)AN node not supporting the QoS measurement), the SMF 220 may need to apply N4 Session Modification procedure in order to deactivate the QoS measurement mechanism in the UPF.

At some point after establishing the data connection (here a PDU session), the UPF 225 processes a DL data packet received from the AF 230 over N6 interface (see signaling 630) and the UPF 225 determines (e.g., based on the Packet Detection Rules) the QoS flow and the corresponding N3 tunnel to be used to transmit the packet to the (R)AN node. Moreover, because the QoS monitoring has been setup (refer to signaling 610), the UPF determines (e.g., according to the marking pattern/frequency) whether to mark the DL data packet. In the depicted embodiment, the UPF 225 marks the DL data packet by including in the N3 encapsulation header (e.g., GTP-U header) the usual Tunnel Endpoint identifier ("TEID"), QoS marking, additionally a (1) N3 PDU sequence number ("SN") and (2) an indication for packet delivery report (or alternatively the indication can be for QoS monitoring required or QoS measurement required). The UPF 225 sends the marked (e.g., modified) DL data packet (e.g. GTP PDU) to the (R)AN node 210 (see signaling 635).

In some embodiments, when the UPF 225 sends the DL data packet with an indication for packet delivery report, the UPF 225 starts a timer. The UPF 225 then stops the timer when DL data delivery report is received for the given downlink GTP PDU's SN. Alternatively, the UPF 225 may record the local UPF time when the DL data packet is sent and compare this to the local UPF time when the delivery report is received. In both cases, the elapsed time (e.g., round-trip time from UPF 225 to UE, which is also referred as "$T_{MEAS}$") may be used to determine a DL QoS parameter.

Having received the marked (modified) DL data packet, the (R)AN node 210 transmits the DL user data to the UE 205, e.g., over the radio interface (see signaling 640). Based on the marking (or indication) in the N3 header (e.g. GTP-U header) of the downlink user packet, the (R)AN node 210 is aware that QoS monitoring for this packet is required. Moreover, the (R)AN node 210 determines the downlink transmission delay, e.g., the delay from user packet arrival at the (R)AN node 210 to the successful transmission to the UE 205. In various embodiments, the (R)AN node 210 may determine that a DL data packet has been successfully received at the UE 205 upon receiving HARQ feedback to a corresponding transport block ("TB") that contained the packet intended for DL Data delivery reporting (e.g., as marked by UPF 225).

Here, after successful transmission of the DL packet the (R)AN node 210 immediately sends a DL data delivery report (or another similar message) to the UPF 225 (see signaling 645). In certain embodiments, the delivery information may be carried in a message similar to the "Downlink Data Delivery Status" message as specified in TS 36.425 clause 5.4.2. In one alternative, the delivery information may be carried a new GTP message (e.g. GTP-U signaling message). Yet in another alternative, the DL data delivery report may be carried, e.g. piggy-backed, in an uplink data packet. In various embodiments, the DL data delivery report includes the SN of the downlink packet, and an Acknowledgement (Ack) indicating successful delivery. The UPF 225 determines QoS measurements (e.g., for monitored parameter(s)) using delivery information, e.g., from the DL data delivery report (see block 650).

When the (R)AN node 210 delivers the DL packet, the (R)AN node 210 immediately sends the DL data delivery report to the UPF 225 including the SN (see signaling 645). In other words, the DL data delivery report is sent when the DL packet is successfully delivered. In certain embodiments, sending of DL data delivery report for unsuccessful delivery is not needed because the UPF 225 runs a timer for each marked DL packet and can determine the packet loss based on exceed of a particular timer value.

The UPF 225 processes the DL data delivery report message (or alternatively the indication from a GTP-U encapsulation header carrying the acknowledgement for data delivery). In certain embodiments, the UPF 225 stops the corresponding timer for this SN and determines the PDB or the PDB-jitter or PER or other parameter in the downlink using an amount of elapsed time indicated by the timer.

In various embodiments, the delay or RTT for transmission over N3 interface (denoted as "RTT_N3") is known in the UPF 225 and is used to determine the DL QoS parameter(s). For example, the UPF 225 may periodically send a GTP-U Echo Request message and by receiving a corresponding Echo Reply message, the UPF 225 can measure the RTT over the N3 interface.

Note that in scenario where an intermediate UPF is deployed (not shown in FIG. 6), both the intermediate UPF and the anchor UPF may measure the (R)AN-to-anchor-UPF path. Here, the anchor UPF may measure the RTT for transmission over N9 interface (e.g. "RTT_N9") between the anchor UPF and the intermediate UPF. Also, the intermediate UPF may measure the RTT for transmission over N3 interface (e.g. RTT_N3) between the intermediate UPF and the RAN node. In such scenario, the intermediate UPF includes the measured N3 RTT in the N9 interface GTP-U header together with the mirrored "Downlink Data Delivery Status" message. In some embodiments, the UPF 225 may decide to measure the N3 interface delay, and if needed N9 interface delay, (i.e. the UPF 225 decides to send GTP Echo message) if the measured PDB was higher than the target PDB. In other words, the RTT_N3 and RTT_N9 (the sum of which is referred as "second delay amount") may not be measured periodically, but triggered by an event, e.g. the event is that actual/measured DL PDB (as explained in FIG. 6) or actual/measured UL PDB (as explained in FIGS. 7A and 7B) for a packet exceeds the target PDB.

The time elapsed at the UPF between the transmission of the DL data and the reception of the DL data delivery report message for the same packet (same SN) is denoted as "$T_{MEAS}$." The actual downlink PDB ("$T_{PDB-DL}$") on the path from UPF to the UE can be calculated using the one of the following equations:

$$T_{PDB-DL}=T_{MEAS}-(RTT\_N3/2) \qquad \text{Equation 1}$$

$$T_{PDB-DL}=T_{MEAS}-(RTT\_N3/2+RTT\_N9/2) \qquad \text{Equation 2}$$

Note that Equation 1 is appropriate for calculating the actual downlink PDB where there is no intermediate UPF, for example as shown in FIG. 2, while Equation 2 may be used where there is an intermediate UPF in the user plane path.

In some embodiments, UPF 225 may measure the PDB-jitter by measuring the PDB for several consecutive DL packets. Alternatively, the UPF 225 may measure the PDB for each e.g., 10' DL packets. In both cases, the UPF 225 compares the PDB measurements and determines the PDB-jitter.

Note that if a DL data delivery report message is not received in the UPF 225 by the time when the timer for a particular DL packet (e.g. particular SN) exceeds a predefined value (e.g. PDB according to the 5QI or QCI, e.g. 10 ms), then the UPF 225 considers the DL packet as lost. In various embodiments, the UPF 225 considers this DL packet loss to calculate the PER.

Additionally, the UPF 225 sends QoS monitoring report to the SMF (see signaling 655). The QoS report from the UPF 225 may contain the various information. For example, a particular example can be "Measured PDB for 10% of packets=target PDB+2 ms; Measured PDB for other 10% of packets=target PDB+3 ms." Here, the UPF 225 may send the QoS report periodically or, alternatively, only when the QoS measurements have exceeded certain threshold of the used QoS profile.

Note that the QoS monitoring report may be for downlink QoS monitoring only. The UPF 225 may also apply an averaging algorithm for the QoS measurement to avoid too frequent or inaccurate QoS reports to the SMF 220. For example, if the UPF 225 determines that, e.g., 90% of the DL packets exceed certain setup QoS parameter (e.g. downlink PDB or downlink PDB-jitter, packet error rate), this may trigger the UPF 225 to send a report to the SMF 220. Alternatively, if rather instantaneous QoS reporting is desirable (e.g. according to configuration from SMF in the signaling from SMF 220 to UPF 225), the UPF can send report to SMF when it is detected that a given number of packets (e.g. 5 consecutive packets) exceed certain setup QoS parameter. In addition, the QoS report from UPF 225 to SMF 220 may also contain information that identifies the type and the location of a communication error. (e.g., cell id or RAN node id or N3 interface id, etc.). Based on this "communication error location" information from the UPF 225 the SMF 220 may undertake some actions, e.g. knowing that other UEs in this cell or served by this RAN node may also experience QoS deterioration. The first network procedure 600 ends.

Figure 7A:
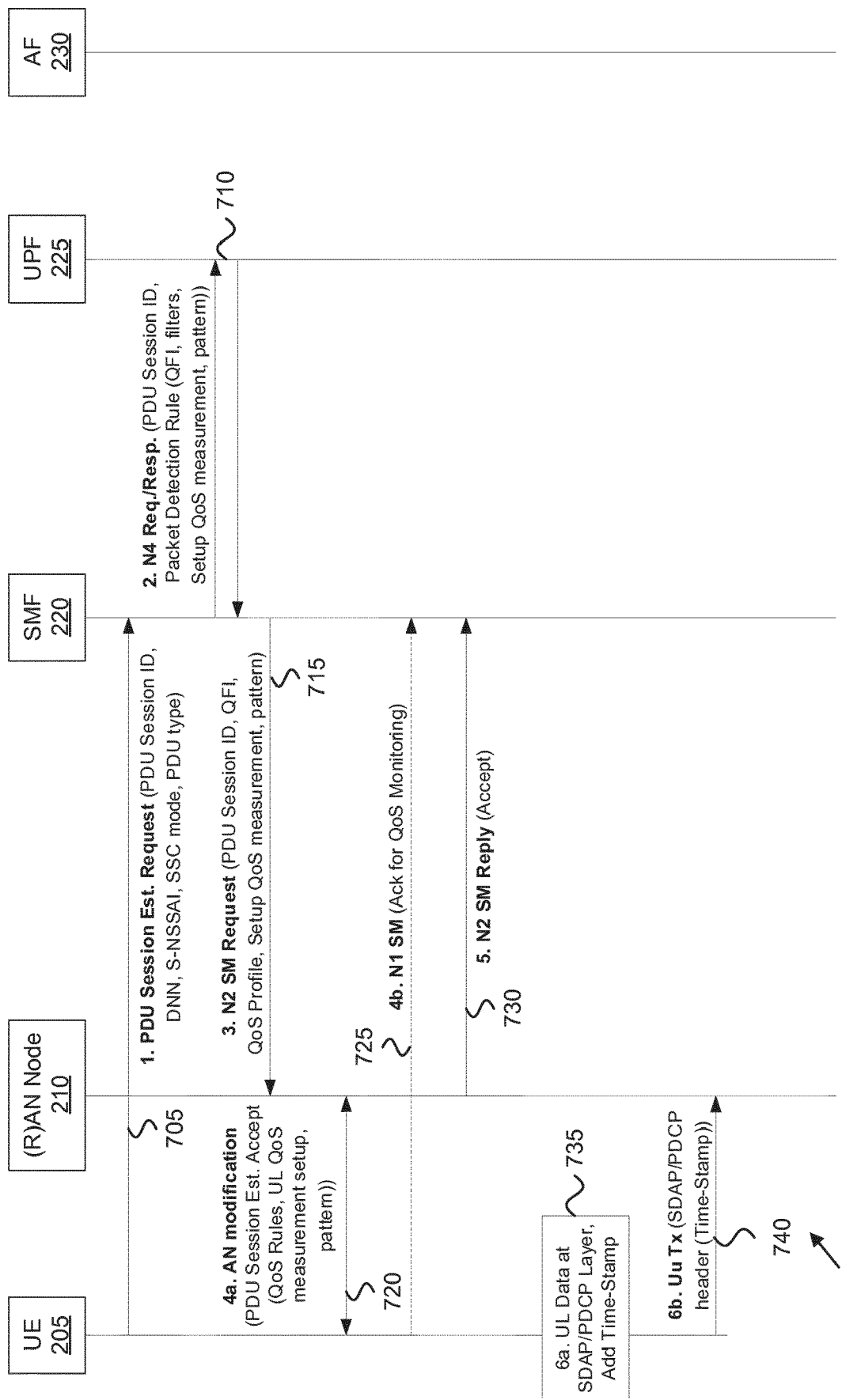
FIG. 7A is a block diagram illustrating one embodiment of a second procedure for monitoring a QoS parameter.
Figure 7B:
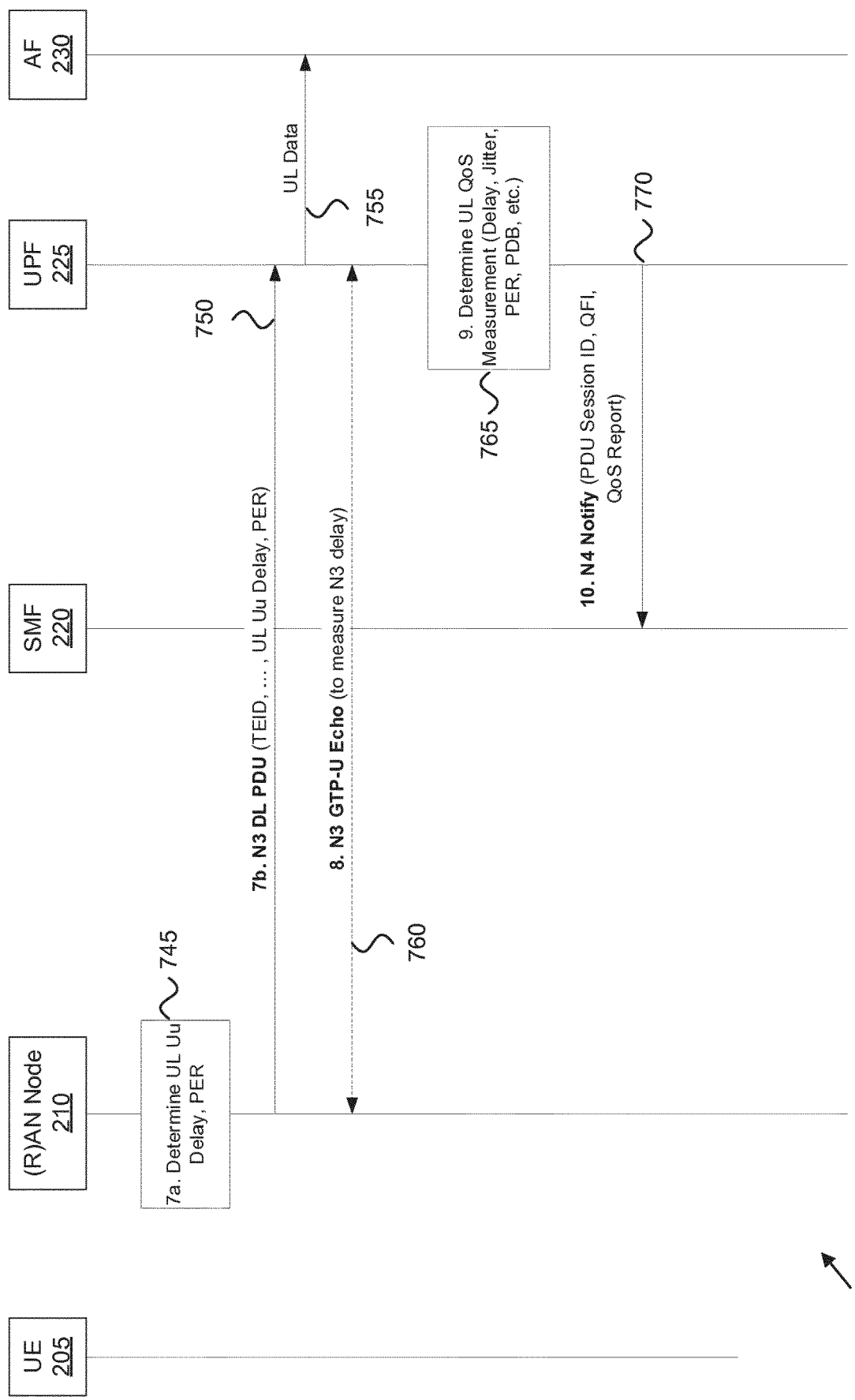
FIG. 7B is a block diagram is a continuation of the procedure of FIG. 7A.

FIGS. 7A-7B depict a second network procedure 700 for monitoring a QoS parameter, according to embodiments of the disclosure. The second network procedure 700 may be used to measure the actual QoS characteristics of a QoS flow (on IP layer, e.g. IP packet delivery delay or for unstructured data packet) between the UE 205 and the UPF 225. In the second network procedure 700, UL QoS parameters are monitored by the UE 205 marking UL packets. The second network procedure 700 involves the UE 205, (R)AN node 210, SMF 220, UPF 225, and AF 230.

Especially for measurements in the uplink (UL), the UE 205 may be configured to add a time-stamp in the UL PDCP PDU (or SDAP PDU). Based on the time-stamp, the (R)AN node 210 measures the UL transmission delay over Uu interface. The message from the (R)AN node 210 to the UPF 225 may be a GTP-U signaling message (e.g. sent between network nodes for path management and tunnel management). A known mechanism for GTP-U path management is the exchange of GTP-U "Echo Request" and "Echo Reply" signaling exchange is already specified, but an Echo Request shall not be sent more often than every 60 s on each path and therefore is unsuitable for monitoring URLLC bearer/QoS flow requirements.

The second network procedure 700 begins with the UE 205 requesting a PDU Session, e.g., sending to the SMF 220 (over AMF) a PDU Session Establishment Request message (see signaling 705). Here, the PDU Session Establishment Request includes a PDU Session ID, a DNN, a S-NSSAI, an SSC mode, and a PDU type. In some embodiments, the PDU Session Establishment Request may also include an enhanced 5GSM Core Network Capability or other indicator of the QoS monitoring capability of the UE 205. Note that the PDU Session Establishment Request message may be encapsulated in a NAS N1 SM message.

Note that the 5GSM Core Network Capability usually includes the UE 205 Integrity Protection Maximum Data Rate parameter. In various embodiments, the 5GSM Core Network Capability is enhanced to additionally include a new parameter (or indication) about the support of uplink QoS monitoring mechanism. Alternatively, the new parameter (or indication) about the support of uplink QoS monitoring mechanism may be included as independent parameter in the PDU Session Establishment Request message (i.e. outside of the 5GSM Core Network Capability).

Upon reception of the PDU Session Establishment Request message, the SMF 220 determines whether QoS monitoring (e.g., QoS measurement) needs to be applied to one or more of the data flows (e.g., QoS flows) for this PDU Session. The determination may be as described above with reference to signaling step 605 of FIG. 6. In addition, the SMF 220 may consider the UE capability, i.e. whether the UE 205 supports the mechanism for uplink QoS monitoring. If the SMF 220 determines that the QoS parameters for one or more QoS flows for this PDU Session require QoS parameter monitoring (e.g. if the QoS flow is for URLLC service), the SMF 220 may consider whether an UPF 225 is capable of QoS monitoring during the UPF selection procedure (FIG. 7 assumes that the SMF 220 selects the UPF 225 which is capable of QoS monitoring).

To implement the QoS monitoring, the SMF 220 initiates an N4 Session Establishment procedure with the selected UPF 225. For example, the SMF 220 sends to the UPF 225 (e.g., via the N4 interface) a request message with packet detection rules (e.g., per QFI) to the selected UPF 225 and additionally indicates to the UPF 225 to setup corresponding mechanism(s) for QoS measurement (see signaling 710). This indication is sent per QoS flow, i.e. per QFI. Please note that this indication can be coded in similar way as shown in signaling 610. In certain embodiments, there may be different indicators (or setting) for QoS monitoring in the downlink direction and for the uplink direction.

In certain embodiments, the SMF 220 may configure the frequency for performing the QoS measurement in the user plane, for example by sending a marking pattern. In one example, the marking pattern may indicate that the measurement is performed for each $5^{th}$ packet, $10^{th}$ packet, etc. Additionally, the SMF 220 may configure a particular QoS parameter to measure. As a non-limiting example, the QoS parameters to measure can be at least (1) delay or PDB for uplink data, (2) delay jitter and/or (3) packet error rate ("PER").

In some embodiments, the UPF 225 acknowledges to the SMF 220 whether the QoS monitoring is accepted and/or whether the UPF 225 is able to apply the QoS monitoring (QoS measurement). Note that if a UPF indicates it is not able to apply the QoS monitoring, then the SMF 220 may select another UPF.

Additionally, the SMF 220 configures the (R)AN node 210 for monitoring QoS parameter(s) by sending a "Setup QoS measurement" indication (see signaling 715). In the depicted embodiment, the SMF 220 sends a N2 SM request that includes the PDU Session ID, QFI(s), QoS Profile(s), CN Tunnel Info, S-NSSAI from the Allowed NSSAI, Session-AMBR, PDU Session Type, User Plane Policy Enforcement, the Setup QoS measurement indication, the marking pattern for UL packets, and the N1 SM container (PDU Session Establishment Accept).

Additionally, the UE 205 receives a "Setup QoS measurement" indication (see signaling 720). In various embodiments, the UE 205 receives a NAS S1 SM container including PDU Session Establishment Accept message or PDU Session Modification request message (e.g., having PDU Session ID, QoS rules, UL QoS measurement setup, and pattern parameters) which includes a new indication to configure (or activate) the UE 205 for UL QoS monitoring (e.g., QoS monitoring is for UL data transmission). Here, the SMF 220 uses the N1 SM container sent within a NAS transport message to the UE 205 to configure the UE 205 with parameters particular to a PDU Session, e.g. Uplink packet filters for different QoS Flows. Additionally, the UE 205 may receive a pattern or frequency to which uplink packets the measurement should be applied. For example, the pattern (or frequency) can be every $10^{th}$ packet from the QoS flow. In certain embodiments, the (R)AN node 210 may configure UE 205 with the marking pattern using RRC signaling.

Moreover, the (R)AN node 210 and UE 205 perform the establishment (or modification) of access network ("AN") resources (see signaling 620). In the depicted embodiment, the (R)AN node 210 sends an AN modification message that includes DRB establishment for the PDU Session (or QoS flow) indicated in the N2 SM request. Note that the AN modification message includes the N1 SM container containing the PDU Session Establishment Accept message (or PDU Session Modification request message).

Please note that explicit signaling from the UE 205 to the SMF 220 may optionally be needed to acknowledge whether the QoS monitoring is successfully configured (or accepted) in the UE 205 (see signaling 425). This step may be required in order to have a deterministic behavior and it is a means for the SMF 220 to know whether the QoS monitoring will be implemented at the UE 205. Alternatively, the indication to configure (or activate) the UE 205 for UL QoS monitoring may be included in the AS signaling. In various embodiments, the (R)AN node 210 replies to the SMF 220 that the QoS monitoring is successfully configured and/or that the requested QoS profile is acceptable (see signaling 730).

At some point after establishing the data connection (here a PDU session), the UE 205 generates and uplink data packet. If the UL data packet is passed down from the IP layer to the radio data layer (e.g., SDAP or PDCP layer) of the DRB or QoS flow to which QoS monitoring is activated and the pattern matches (e.g., each $10^{th}$ packet), then the access stratum (or radio data layer) of the UE 205 includes a time-stamp in the radio data layer header (see block 735). In certain embodiments, the time-stamp is a relative time unit, e.g., based on the system time broadcasted by the respective (R)AN node 210 under which the UE is connected (or camping). For example, the time-stamp may be the radio frame sequence number, sub-frame number and further timing information, and the like. In other embodiments, the time-stamp may be absolute time information, e.g., GPS time information.

The UE 205 transmits the marked (e.g., modified) UL data packet, e.g., with the prepended header, to the (R)AN node 210 (see signaling 740). In one embodiment, the time-stamp information is conveyed in the header information of a PDCP Data PDU or SDAP Data PDU. For example, a one-bit flag in the SDAP or PDCP Data PDU header may indicate the presence of the time-stamp field. According to certain embodiments, a reserved bit in the current SDAP or PDCP Data PDU format may be used as the one-bit flag to indicate the presence of the time-stamp field. Alternatively, and according to another embodiment, the time-stamp information may be carried in a new SDAP or PDCP control PDU.

According to the current standard the PDCP Control PDU is used to convey either a PDCP status report or an interspersed ROHC feedback. In certain embodiments, a new PDU type is introduced indicating the new type of control information included in the corresponding PDCP Control PDU, e.g., time-stamp information. Here, the PDCP layer and/or SDAP layer are configured, e.g. by higher layer signaling, with rules when to include the time-stamp information in a SDAP/PDCP data PDU respectively and/or when to generate a SDAP/PDCP control PDU.

Note that the UE 205 needs to ensure that the time-stamp is used only for QoS Flows (with corresponding QFI) intended/configured for such a delivery reporting. For example, if two QoS Flows are mapped to the same Bearer, the Control PDU carrying the time-stamp (e.g., every $10^{th}$ packet) is sent only corresponding to the QoS flow that was intended/configured for such a delivery reporting by the UPF 225.

Continuing at FIG. 7B, the (R)AN node 210 processes the header of the radio data layer and determines that the time-stamp is included in the packet, e.g. based on the SDAP or PDCP header information. The (R)AN node 210 then calculates the uplink radio transmission delay time for this datagram (denoted as $T_{UL\text{-}Tx\text{-}Uu}$)(see block 745). In various embodiments, the (R)AN node 210 calculates the $T_{UL\text{-}Tx\text{-}Uu}$ by subtracting the current time at the (R)AN node with the time-stamp from the UL radio data layer header.

In addition to the determining of the uplink radio transmission delay time for a marked uplink packet, the (R)AN node 210 may also determine the packet error rate (PER) of the uplink transmissions (see block 745). Here, the (R)AN node 210 may determine such PER based on the mechanism from lower radio layers. The PER is the amount of unsuccessful packet transmissions from a given number of transmissions. For example, the given number of uplink transmissions can be 100, so the PER calculated at the (R)AN node would be how many packets out of 100 packets were erroneous (e.g. 98% PER would mean that 2 packets were erroneous out of 100 transmitted packets in the uplink).

Next, the (R)AN node 210 includes the uplink radio transmission delay time ($T_{UL\text{-}Tx\text{-}Uu}$) (and optionally the PER) in the uplink packet header on the N3 interface (see signaling 750). While the depicted embodiment does not use an intermediate UPF, note that it is possible to have a N9 interface between an intermediate UPF (e.g. uplink classifier or branching node function) and UPF anchor (PDU Session anchor, "PSA"). In such case, the uplink radio transmission delay time ($T_{UL\text{-}Tx\text{-}Uu}$) from the N3 interface packet header is copied in the N9 interface packet header.

In the depicted embodiment, it is assumed that the UPF 225 is the PSA.

The UPF 225 receives the UL data packet and forwards it to the AF 230 (see signaling 755). Additionally, the UPF 225 may perform measurement for transmission delay over the N3 interface. In one example, the UPF 225 sends a GTP-U Echo request message and the corresponding GTP-U entity (here, the (R)AN node 210 sends a GTP-U Echo response message (see signaling 760). By this message exchange, the UPF 225 measures the round-trip time (RTT) on the N3 interface. Note that if an N9 interface is included in the user plane path for this QoS flow, then the N9 delay is also measured.

Moreover, the UPF 225 (having the role of PSA) determines the uplink QoS measurement(s), such as Delay, Jitter, and/or PER (see block 765). The actual measured uplink PDB on the path from UE to the UPF can be calculated using one of the following equations:

$$T_{PDB-UL} = T_{UL-Tx-Uu} + (RTT\_N3/2) \quad \text{Equation 3}$$

$$T_{PDB-UL} = T_{UL-Tx-Uu} + (RTT\_N3/2) + (RTT\_N9/2) \quad \text{Equation 4}$$

Note that Equation 3 is appropriate for calculating the actual downlink PDB where there is no intermediate UPF, while Equation 4 may be used where there is an intermediate UPF in the user plane path. In Equations 3 and 4, the $T_{UL-Tx-Uu}$ is the value from the N3 packet header (e.g. as reported from the (R)AN node 210 in the GTP-U tunnel header). If a N9 interface is included on the user plane path between the UE 205 and the PSA, then the intermediate UPF may measure the RTT_N3 and the PSA may measure the RTT_N9. In such embodiments, the intermediate UPF includes the measured RTT_N3 in the N9 interface header together with the $T_{UL-Tx-Uu}$.

In some embodiments, the UPF 225 calculates the uplink delay jitter by comparing the actual uplink transmission delay of each marked uplink packet. Assuming that each $10^{th}$ packets is marked, then the packet #10 had delay 5.0 ms, packet #20 had delay 5.5 ms and packet #30 had delay of 4.5 ms, then the delay jitter would be 1 ms.

The uplink PER may be also calculated in the UPF 225 if the UPF 225 is inspecting (e.g. deep packet inspection in the uplink) the sequence numbers of the transport protocol (e.g. TCP or SCTP). Note that this mechanism may only be applicable if the transport layer contains sequence numbers.

Additionally, the UPF 225 sends a QoS monitoring report to the SMF 220 (see signaling 770). Note that the QoS monitoring report may be for uplink QoS monitoring only. Here, the UPF 225 may send the QoS report periodically or, alternatively, only when the QoS measurements have exceeded certain threshold of the used QoS profile. The UPF 225 may also apply an averaging algorithm for the QoS measurement to avoid too frequent or inaccurate QoS reports to the SMF 220. For example, if the UPF 225 determines that, e.g., 90% of the UL packets exceed certain setup QoS parameter (e.g. uplink PDB or uplink PDB-jitter), then this may trigger the UPF 225 to send a report to the SMF 220. The QoS monitoring report in signaling 770 can have the format and can include indication similar to the DL parameter QoS monitoring report described above with reference to FIG. 6 (e.g., the signaling 655 of the first procedure 600), but where the reported parameters are for the uplink QoS monitoring. The first network procedure 700 ends.

Please note that the UPF 225 may send separate QoS monitoring reports for downlink and for uplink and may send the separate reports at separate times (e.g., in response to different triggers). In another embodiment, the UPF 225 may send a single report including all gathered QoS monitoring information (for both downlink and uplink).

Figure 8:
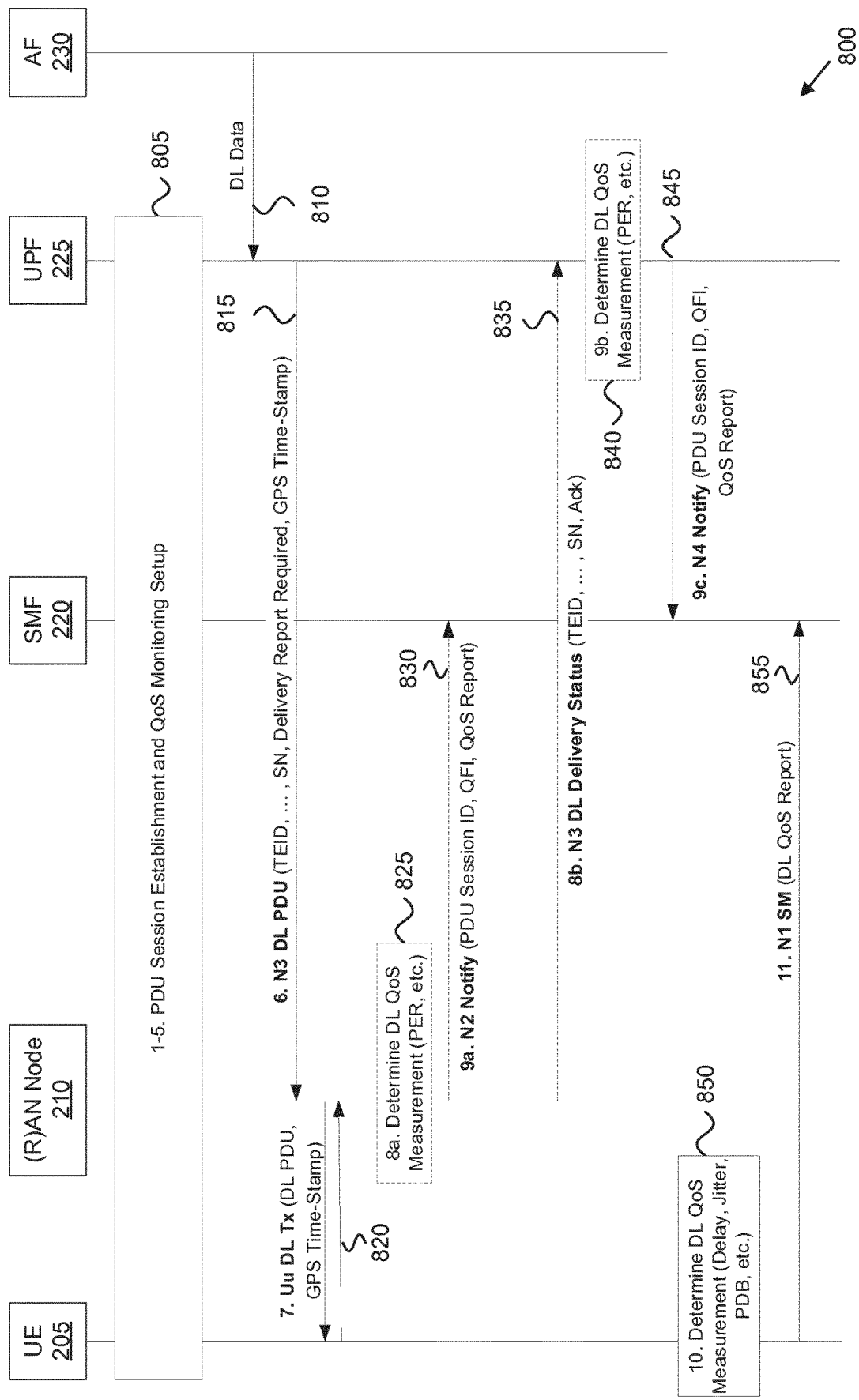
FIG. 8 is a block diagram illustrating one embodiment of a third procedure for monitoring a QoS parameter.

FIG. 8 depicts a third network procedure 800. The third network procedure 800 involves the UE 205, (R)AN node 210, SMF 220, UPF 225, and AF 230. In the third network procedure 800, an alternative mechanism for monitoring downlink QoS parameter(s) is described. A key difference between the first network procedure 600 and the third network procedure 800 is that the UE 205 and UPF 225 (e.g. the anchor UPF or PSA) are time synchronized in the third network procedure 800, e.g., using time signals from a satellite positioning system (e.g., GPS). Note that in the first network procedure 600 there is time synchronization between the UE 205 and (R)AN node 210, but not between the UE 205 and UPF 225 (or between the (R)AN node 210 and UPF 225).

The third network procedure 800 begins with the UE 205, (R)AN node 210, SMF 220, and UPF 225 establishing a PDU Session and setting up QoS monitoring (see block 805), as described above with reference to FIG. 6. Here, block 805 corresponds to signaling steps 605-625. In addition (or in difference) to signaling steps 605-625, in block 805, the UE 205 may indicate to the SMF 220 whether the below described QoS monitoring mechanism based on absolute time (e.g. GPS) is supported. Furthermore, the SMF 220 may also consider whether the UPF 225 and/or in RAN node 210 also support QoS monitoring based on GPS time. For example, if the UE 205, SMF 220, RAN node 210 and UPF 225 all support QoS monitoring based on GPS time-stamp, then the SMF 220 may configure the UE 205, RAN node 210 and UPF 225 to apply QoS monitoring as described in the procedure 800.

At some point after establishing the data connection (here a PDU session), the UPF 225 processes a DL data packet received from the AF 230 over N6 interface (see signaling 810) and the UPF 225 determines (e.g., based on the Packet Detection Rules) the QoS flow and the corresponding N3 tunnel to be used to transmit the packet to the (R)AN node. Moreover, because the QoS monitoring has been setup (refer to block 805), the UPF 225 determines (e.g., according to the marking pattern/frequency) whether to mark the DL data packet. In the depicted embodiment, the UPF 225 marks the DL data packet by including a global time-stamp, such as a GPS time-stamp. In certain embodiments, the UPF 225 may include an indication for packet delivery report (or alternatively the indication can be for QoS monitoring or QoS measurement required). The UPF 225 sends the marked (e.g., modified) DL data packet to the (R)AN node 210 (see signaling 815).

Having received the marked (modified) DL data packet, the (R)AN node 210 transmits the DL user data to the UE 205, e.g., over the radio interface (see signaling 820). Note that, when the DL packet arrives at (R)AN node 210, the (R)AN node 210 can include the GPS time-stamp in a header of a Uu-interface protocol, e.g. in PDCP or SDAP. In certain embodiments, e.g., where the packet error rate (PER) is being monitored at the UPF 225, the (R)AN node 210 may immediately send a DL data delivery report (or a similar message) to the UPF 225 (see signaling 835) after successful transmission of the DL packet. Note that the DL packet error rate (PER) may be determined at the UE 205 on layers higher than the 3GPP transport, i.e. TCP UDP/RTSP. Therefore, it is possible to measure the DL PER in the network, whereas two alternatives are described as follows. In one alternative, the PER may be measured at the (R)AN node 210, e.g., as described in the first network procedure 600 where the (R)AN node 210 determines whether a DL packet is successfully transmitted to the UE 205 (see block 825). In this alternative, the (R)AN node 210 may signal the measured PER directly to the SMF 220 using the Notification procedure (see signaling 830).

In another alternative, the PER is monitored at the UPF 225. Here, when the UPF 225 sends the DL data packet with an indication for packet delivery report, the UPF 225 starts a timer. The UPF 225 then stops the timer when DL data delivery report is received for the given SN (see signaling 835). Alternatively, the UPF 225 may record the GPS time when the DL data packet is sent and compare this to the GPS time when the delivery report is received. In both cases, the elapsed time (e.g., round-trip time) is used by the UPF 225 to determine the DL QoS parameter (e.g., the DL PER). Thus, the UPF 225 may use the DL data delivery report to measure certain DL QoS parameters, such as PER (see block 840). In such embodiments, the UPF 225 generates and sends a QoS report to the SMF 220 (see signaling 845). Note, however, that if the (R)AN node 210 monitors and reports the PER, then there is no need for signaling step 835 and timer processing at the UPF 225.

Additionally, note that the (R)AN node 210 is able to measure the PER in UL and in DL, so that the QoS reporting of the PER parameter in both UL and DL may be performed by the (R)AN node 210. Whether to apply QoS monitoring for PER parameter in the (R)AN node 210 or in the UPF 225 may be determined and configured from the SMF 220 during the QoS monitoring setup (refer to block 805). Here, the determination may be based on various capabilities of the (R)AN node 210 and UPF 225 and/or based on internal configuration or policies of the SMF 220. The QoS monitoring for PER parameter in the RAN node 210 can also be applicable to other embodiments of this disclosure, e.g., to the procedures 600 and 700.

When the UE 205 receives the DL data, the UE 205 may then calculate the downlink delay (DL PDB) based on the global (e.g., GPS) time-stamp from the DL packet and a current (e.g., GPS) clock time in the UE 205. After gathering information over some time period or based on some event, the UE 205 determines one or more DL QoS parameters (see block 830) and creates a DL QoS monitoring report. The DL QoS parameters monitored by the UE 205 may include one or more of: DL delay, DL PDB, DL PDB-jitter, and the like. In some embodiments, the UE 205 may measure the PDB-jitter by measuring the PDB for several consecutive DL packets. Alternatively, the UPF 225 may measure the PDB for non-consecutive DL packets, e.g., $10^{th}$ DL packets. In both cases, the UE 205 compares the DL PDB measurements and determines the PDB-jitter.

Additionally, the UE 205 sends one or more QoS monitoring reports, e.g., for the DL data delivery, to the SMF (see signaling 855), for example using NAS N1 SM signaling messages. Note that the UE 205 may send the QoS report periodically or, alternatively, only when the QoS measurements have exceeded certain threshold of the used QoS profile. The UE 205 may also apply an averaging algorithm for the QoS measurement to avoid too frequent or inaccurate QoS reports to the SMF 220.

Note that the UE 205, (R)AN node 210, and UPF 225 may send a QoS report periodically or, alternatively, only when the QoS measurements have exceeded certain threshold of the used QoS profile. The UPF 225 may also apply an averaging algorithm for the QoS measurement to avoid too frequent or inaccurate QoS reports to the SMF 220. The third network procedure 600 ends.

Figure 9:
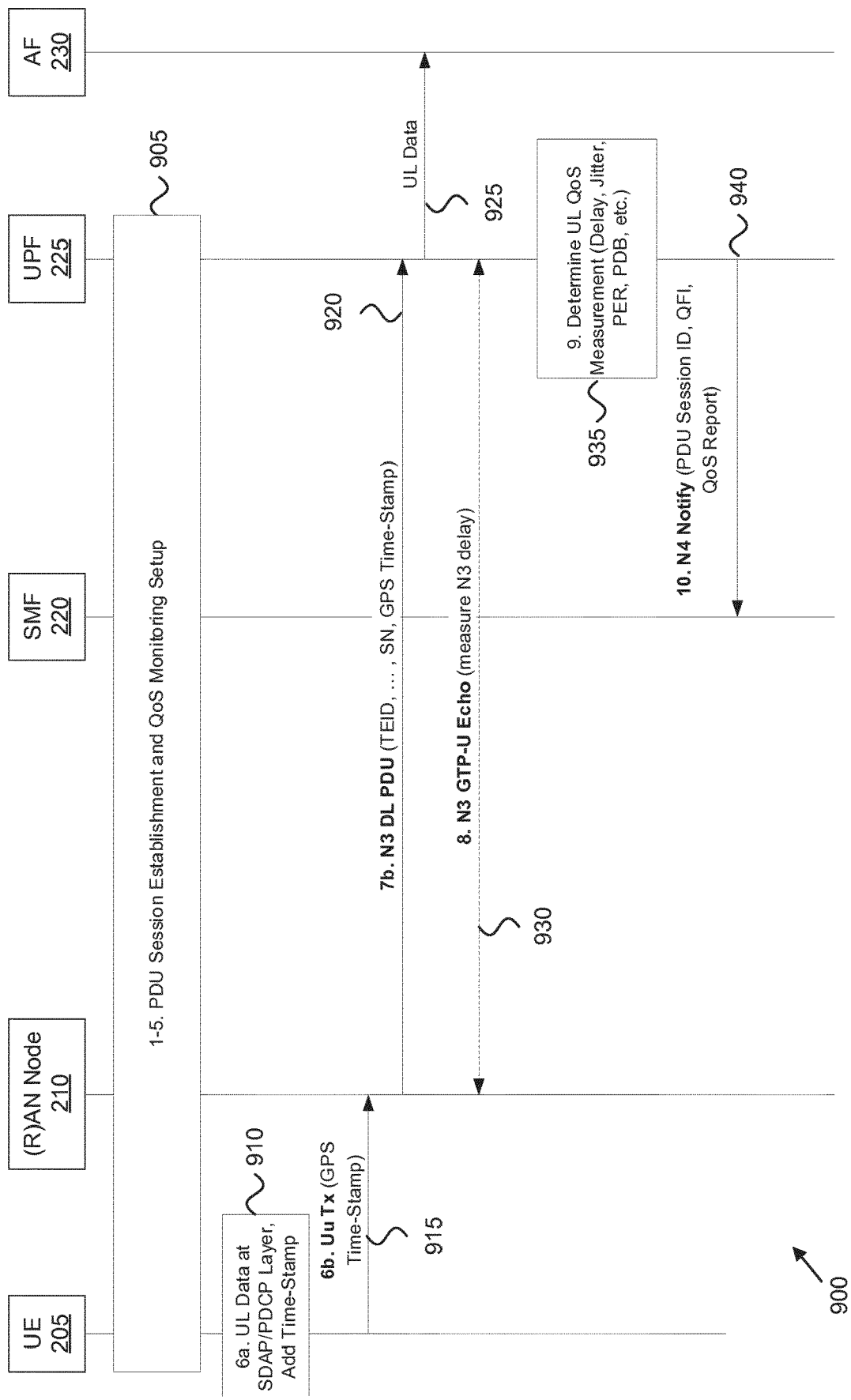
FIG. 9 is a block diagram illustrating one embodiment of a fourth procedure for monitoring a QoS parameter.

FIG. 9 depicts a fourth network procedure 900. The fourth network procedure 900 involves the UE 205, (R)AN node 210, SMF 220, UPF 225, and AF 230. In the fourth network procedure 900, an alternative mechanism for monitoring uplink QoS parameter(s) is described. A key difference between the second network procedure 700 and the fourth network procedure 900 is that the UE 205 and UPF 225 (e.g. the anchor UPF or PSA) are time synchronized in the fourth network procedure 900, e.g., using time signals from a satellite positioning system (e.g., using a GPS receiver implemented in the UE 205 and the UPF 225). Note that in the second network procedure 700 there is time synchronization between the UE 205 and (R)AN node 210, but not between the UE 205 and UPF 225 (or between the (R)AN node 210 and UPF 225).

The fourth network procedure 900 begins with the UE 205, (R)AN node 210, SMF 220, and UPF 225 establishing a PDU Session and setting up QoS monitoring (see block 905), as described above with reference to FIG. 7. Here, block 905 corresponds to signaling steps 705-730. In addition (or in difference) to signaling steps 705-730, in block 905, the UE 205 may indicate to the SMF 220 whether the below described QoS monitoring mechanism based on absolute time (e.g. GPS, i.e. as required by network procedure 900) is supported. Furthermore, the SMF 220 may also consider whether the UPF 225 and/or in RAN node 210 also support QoS monitoring based on GPS time. For example, if the UE 205, SMF 220, RAN node 210 and UPF 225 all support QoS monitoring based on GPS time, then the SMF 220 may configure the UE 205, RAN node 210 and UPF 225 to apply QoS monitoring as described in the procedure 900.

At some point after establishing the data connection (here a PDU session), the UE 205 generates and uplink data packet. If the UL data packet is passed down from the IP layer to the radio data layer (e.g., SDAP or PDCP layer) of the DRB or QoS flow to which QoS monitoring is activated and the pattern matches (e.g., each $10^{th}$ packet), then the Access Stratum (e.g. radio data layer) of the UE 205 includes a global time-stamp (e.g., from a GPS receiver) in the radio data layer header (see block 910). Note that the UE 205 needs to ensure that the time-stamp is used only for QoS Flows (with corresponding QFI) intended/configured for such a delivery reporting.

The UE 205 transmits the marked (e.g., modified) UL data packet, e.g., with the prepended header, to the (R)AN node 210 (see signaling 915). In one embodiment, GPS time-stamp information is conveyed in the header information of a PDCP Data PDU or of a SDAP Data PDU. For example, a one-bit flag in the SDAP or PDCP Data PDU header may indicate the presence of the time-stamp field. According to certain embodiments, a reserved bit in the current SDAP or PDCP Data PDU format may be used as the one-bit flag to indicate the presence of the time-stamp field. Alternatively, and according to another embodiment, the time-stamp information may be carried in a new SDAP control PDU or PDCP control PDU.

The (R)AN node 210 processes the header of the radio data layer and determines that the time-stamp is included in the packet, e.g. based on the SDAP or PDCP header information. In certain embodiments, the (R)AN node 210 may determine the packet error rate (PER) of the uplink transmissions (see block 745). Here, the (R)AN node 210 may determine such PER based on the mechanism from lower radio layers (e.g., MAC layer).

Next, the (R)AN node 210 sends the UL data to the UPF 225, e.g., encapsulated in GTP-U PDU, and includes the GPS time-stamp (and optionally the PER) in the uplink packet header on the N3 interface (see signaling 920), e.g., in the GTP-U PDU header. While the depicted embodiment does not use an intermediate UPF, note that it is possible to have a N9 interface between an intermediate UPF (e.g. uplink classifier or branching node function) and UPF anchor (PSA). In such case, the GPS time-stamp (and PER information, where applicable) from the N3 interface packet header is copied in the N9 interface packet header. In the depicted embodiment, it is assumed that the UPF 225 is the PSA.

The UPF 225 receives the UL data packet and forwards it to the AF 230 (see signaling 925). When the UPF 225 receives the packet, the UPF 225 determines the UL transmission latency (e.g., calculates measured UL PDB). The UPF 225 compares the GPS-time included in the GTP-U PDU header (i.e. the transmission time at UE 205) with the reception GPS-time at UPF, and by this comparison the UPF 225 determines the measured UL delay (and/or calculates measured UL PDB). Note that the GPS time-stamp may not be included in each packet; rather, the UE 205 may include the GPS time-stamp, e.g., every $5^{th}$ or $10^{th}$ packet according to the configured marking pattern, e.g., as configured by the SMF 220.

Note that in the procedure 900 the UPF 225 does not need to determine a (R)AN node 210 to UPF delay, in contrast to the procedure 700, as the times measured using GPS-time account for the delay over this portion of the user plane path. Thus, in the procedure 900 the UPF 225 is not required to send a GTP-U Echo request message to measure the RTT on the N3 interface (an N9 interface, where applicable).

Moreover, the UPF 225 (having the role of PSA) determines the uplink QoS measurement(s), such as Delay, Jitter, and/or PER (see block 935). In some embodiments, the UPF 225 calculates the uplink delay jitter by comparing the actual uplink transmission delay of each marked uplink packet. The uplink PER also may be calculated in the UPF 225 if the UPF 225 is inspecting (e.g. deep packet inspection in the uplink) the sequence numbers of the transport protocol (e.g. TCP or SCTP).

Additionally, the UPF 225 sends a QoS monitoring report to the SMF 220 (see signaling 940). Note that the QoS monitoring report may be for uplink QoS monitoring only. Here, the UPF 225 may send the QoS report periodically or, alternatively, only when the QoS measurements have exceeded certain threshold of the used QoS profile. The UPF 225 may also apply an averaging algorithm for the QoS measurement to avoid too frequent or inaccurate QoS reports to the SMF 220. For example, if the UPF 225 determines that, e.g., 90% of the UL packets exceed certain setup QoS parameter (e.g. uplink PDB or uplink PDB-jitter), this may trigger the UPF 225 to send a report to the SMF 220. The fourth network procedure 900 ends.

Please note that the UPF 225 may send separate QoS monitoring reports for downlink and for uplink and may send the separate reports at separate times (e.g., in response to different triggers). In another embodiment, the UPF 225 may send a single report including all gathered QoS monitoring information (for both downlink and uplink).

Note that the periodicity of sending QoS monitoring reports (1) from UE 205 to SMF 220 or (2) from UPF 225 to SMF 220 may be configured during PDU Session establishment/modification procedure towards the UE 205 or during the N4 exchange towards the UPF 225.

The SMF 220 gathers measurements from UPF and/or from UE. The SMF may inform PCF 147 or AF 230 upon degradation or improvement of QoS parameters, so that the AF 230 may take measures on the application level to adapt the data rate or to adapt the application behavior.

In some embodiments, the QoS monitoring report may be one (or a combination) of the following types: 1) Boolean: Meets-the-latency-aspect-of-QoS (True/False); 2) Range reporting: the corresponding range is reported as an index (e.g., a value to indicate latency less than 1 ms, another value to indicate latency more than 1 ms but less than 1.5 ms, a third value to indicate latency more than 1.5 ms but less than 2 ms, etc.); and 3) Absolute differential of the time-stamp received as part of header and the time when the packet is received is reported as QoS monitoring report. In other embodiments, the QoS monitoring report may have a different form.

In certain embodiments, the QoS report from UPF 225 to SMF 220 may also contain information that identifies the type and the location of a communication error (e.g., cell id or RAN node id or N3 interface id). Note that to support this additional information, the (R)AN node 210 needs to send this additional information (e.g., cell id or RAN node id or N3 id) to the UPF 225, for example by including it in the "packet delivery report."

In various embodiments of the disclosure, a combination of the procedure 600 (e.g., the DL QoS monitoring is performed at the UPF 225) and the procedure 900 (e.g., the UL QoS monitoring is performed at the UPF 225 based on the GPS time-stamp from the UE 205) is possible. In such embodiments, the QoS monitoring in DL and the QoS monitoring in UL may be both performed in the UPF 225 only and consequently the QoS monitoring reports are sent only from the UPF 225 to the SMF 220, e.g., the UE 205 is not included in the QoS monitoring reporting signaling (but note that the UE 205 needs to be configures to support the UL QoS monitoring, e.g., by marking UL data packets with a GPS time-stamp, according to the procedure 900).

FIG. 10 depicts a fifth network procedure 1000. The fifth network procedure 1000 involves the UE 205, the (R)AN node 210, the SMF 220, the UPF 225, a PCF 1005, a Network Exposure Function ("NEF") 1010, and the AF 230. In the fourth network procedure 1000, the SMF 220 acts on the QoS reports received from the UPF 225 (and optionally from the UE 205).

The fifth network procedure 1000 begins with PDU Session (or QoS Flow) Establishment, QoS Monitoring Activation, and QoS Monitoring (e.g., measurement gathering) (see block 1015). Note that this step may be implemented by steps 605-650 of FIG. 6, by steps 705-765 of FIG. 7, steps 805-830 of FIG. 8, or steps 905-935 of FIG. 9.

According to a trigger or at regular intervals, the UPF 225 sends to the SMF 220 one or more QoS reports (see signaling 1020). Optionally, the UE 205 may also send one or more QoS reports, for example in response to a trigger event or at a regular interval. These QoS reports relate to the QoS parameter(s) the SMF 220 has indicated are to be measured/monitored.

Next, the SMF 220 determines what actions to take based on the QoS reports from the UPF 225 (and optionally from the UE 205) (see block 1025). If the QoS parameters from the monitored QoS flow are fulfilled, then the SMF 220 does not take any actions, other than recording the data. If, however the QoS parameters from the monitored QoS flow are not fulfilled, the SMF 220 may take one or more actions to remedy the situation.

In certain embodiments, the SMF 220 may trigger new PCC and/or QoS rules (see signaling 1030). Here, the SMF 220 may notify the PCF 1005 about the situation of not fulfilling the QoS parameters. The PCF 1005 may then determine new QoS policy rules and send them to the SMF 220. In some embodiments, the PCF 1005 may need to exchange signaling with the AF 230 to determine the new policy rules. Alternatively, the SMF 220 may directly exchange signaling with the AF 230 to notify the AF 230 about the situation of not fulfilling the QoS parameters and what are the actual monitored QoS parameters. In some embodiments, the SMF 220 may exchange signaling with the AF 230 via the NEF 1010.

In certain embodiments, the AF 230 may take actions on the application level (see signaling 1035), e.g., after being informed about the situation of not fulfilling the QoS parameters. Here, the SMF 220 may directly exchange signaling with the AF 230 or, alternatively, the SMF 220 may inform the AF 230 via the PCF 1005 or NEF 110. In one example, the AF 230 may change an application codec to cope with the changed QoS conditions, while trying to maintain the user's quality of experience. Alternatively, assuming that the UE 205 is an autonomously driving car, the AF 230 may reduce the speed of the UE 205, or increase the distance to other cars to keep the same car security level. If the UE 205 is a machine in a factory, the AF 230 may reduce the speed of the machine or implement other safeguards.

In certain embodiments, the SMF 220 may derive a new QoS profile to be applied to this QoS flow (see signaling 1040). Here, the new QoS profile may be either determined internally in the SMF 220 (based on network configuration in the SMF e.g. via OAM) or the SMF 220 may receive from PCF 1005 or AF 230 a new QoS policy or new QoS requirements to apply to this traffic data flow. The SMF 220 may trigger PDU Session modification procedure or QoS flow modification procedure to change the QoS profile (or QoS rules) for this QoS flow. Note that PDU Session modification procedure includes the SMF 220 informing the UPF 225, the (R)AN node 210, and the UE 205 of the new QoS policy or new QoS requirements to apply to this traffic data flow.

Figure 11:
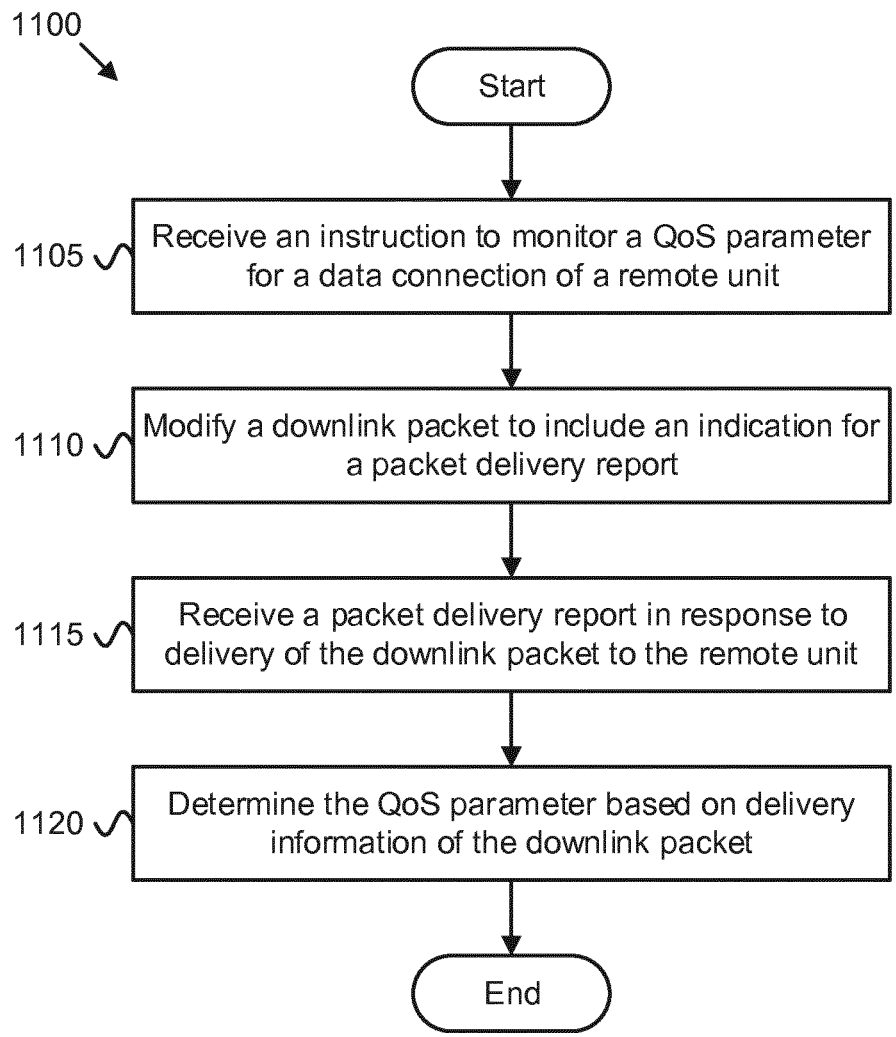
FIG. 11 is a flow chart diagram illustrating one embodiment of a first method for monitoring a QoS parameter.

FIG. 11 depicts a method 1100 for monitoring a QoS parameter, according to embodiments of the disclosure. In some embodiments, the method 1100 is performed by an apparatus, such as the UPF 147, the UPF 235, and/or the network equipment apparatus 400. In certain embodiments, the method 1100 may be performed by a processor executing program code, for example, a microcontroller, a microprocessor, a CPU, a GPU, an auxiliary processing unit, a FPGA, or the like.

The method 1100 begins with receiving 1105 an instruction to monitor a QoS parameter for a data connection of a remote unit. In various embodiments, receiving 1105 the instruction to monitor the QoS parameter includes receiving a marking pattern. In some embodiments, the instruction to monitor the QoS parameter indicates at least a specific data connection (e.g., a specific bearer or data flow) and one or more QoS parameters to be monitored.

The method 1100 includes modifying 1110 a downlink packet to include an indication for a packet delivery report. In certain embodiments, modifying 1110 the downlink packet occurs according to the marking pattern. In some embodiments, modifying 1110 the downlink packet to include the indication for a packet delivery report includes adding the indication to an encapsulation header of the downlink packet. In certain embodiments, modifying 1110 the downlink packet further includes adding a time-stamp to the downlink packet.

The method 1100 includes receiving 1115 a packet delivery report in response to delivery of the downlink packet to the remote unit. In some embodiments, receiving 1115 the packet delivery report includes receiving the packet delivery report from an access network node in a user plane path of the data connection. In one embodiment, the access network node sends the packet delivery report immediately after successful transmission of the downlink packet.

The method 1100 includes determining 1120 the QoS parameter based on delivery information of the downlink packet. In various embodiments, the QoS parameter is a downlink QoS parameter, such as a downlink packet delay budget, a downlink delay jitter, and/or a downlink packet error rate. In certain embodiments, determining 1120 the QoS parameter is based on a comparison of recorded local times corresponding to the sending of the modified delivery packet and receiving the packet delivery report.

In certain embodiments, determining 1120 the QoS parameter based on delivery information of the downlink packet includes determining non-delivery of the downlink packet in response to expiry of the timer prior to receiving a packet delivery report for the downlink packet, such that the QoS parameter is based on the non-delivery of the downlink packet. The method 1100 ends.

Figure 12:
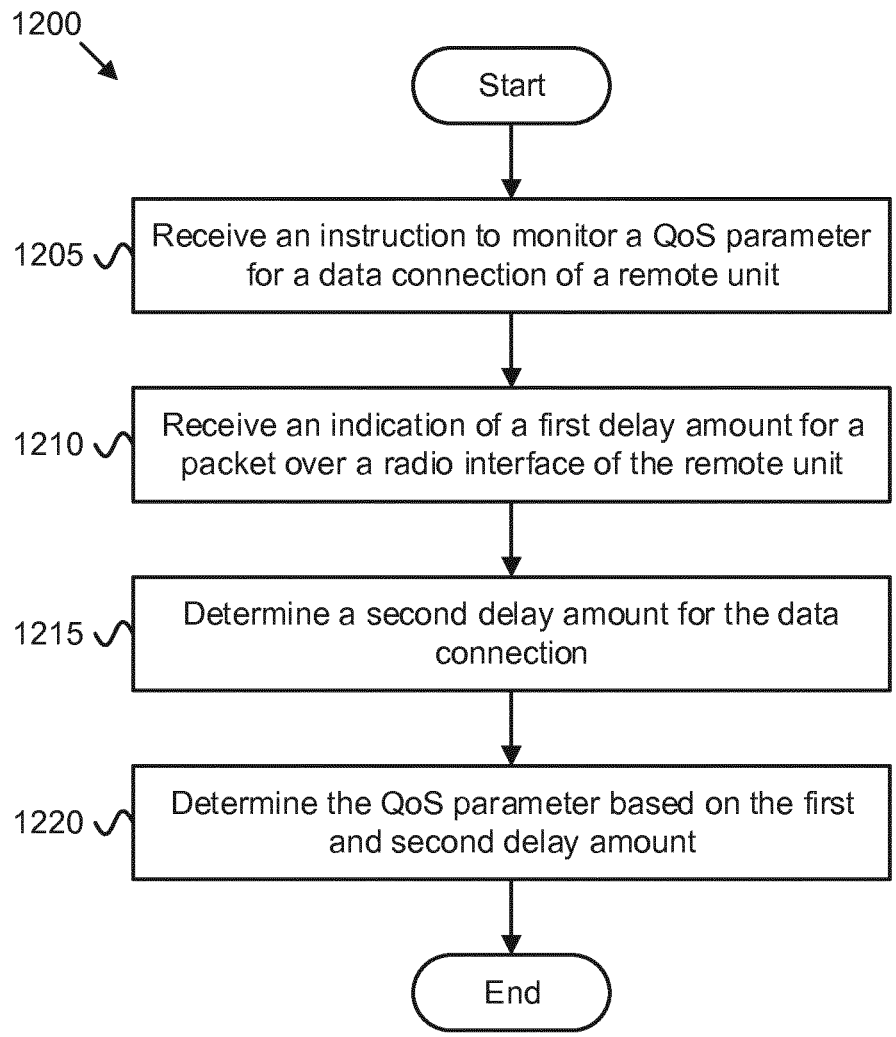
FIG. 12 is a flow chart diagram illustrating one embodiment of a second method for monitoring a QoS parameter.

FIG. 12 depicts a method 1200 for monitoring a QoS parameter, according to embodiments of the disclosure. In some embodiments, the method 1200 is performed by an apparatus, such as the UPF 147, the UPF 235, and/or the network equipment apparatus 400. In certain embodiments, the method 1200 may be performed by a processor executing program code, for example, a microcontroller, a microprocessor, a CPU, a GPU, an auxiliary processing unit, a FPGA, or the like.

The method 1200 begins with receiving 1205 an instruction to monitor a QoS parameter for a data connection of a remote unit. In certain embodiments, receiving 1205 the instruction to monitor the QoS parameter includes receiving a target value for the QoS parameter. In some embodiments, the instruction to monitor the QoS parameter indicates at least a specific data connection and one or more QoS parameters to be monitored.

The method 1200 includes receiving 1210 an indication of a first delay amount for a packet over a radio interface of the remote unit. In certain embodiments, the indication of a first delay amount is received at a first periodicity. In some embodiments, receiving 1210 the indication of a first delay amount includes receiving an uplink radio transmission delay time in an uplink packet header.

The method 1200 includes determining 1215 a second delay amount for the data connection. In some embodiments, determining 1215 the second delay amount includes sending a GTP-U echo request message to an access network node in a user plane path of the data connection. In certain embodiments, the GTP-U echo request is sent according to a second periodicity that is greater than the first periodicity. In some embodiments, determining 1215 the second delay amount occurs in response to a measured packet delay budget exceeding a target packet delay budget.

The method 1200 includes determining 1220 the QoS parameter based on the first and second delay amounts. The method 1200 ends. In certain embodiments, determining 1220 the QoS parameter may include comparing a measured value of the QoS parameter to the target value. In some embodiments, determining 1220 the QoS parameter based on the first and second delay amounts includes determining an amount of delay based on a time-stamped uplink packet. In various embodiments, the QoS parameter includes one of: an uplink packet delay budget, an uplink delay jitter, and an uplink packet error rate.

Figure 13:
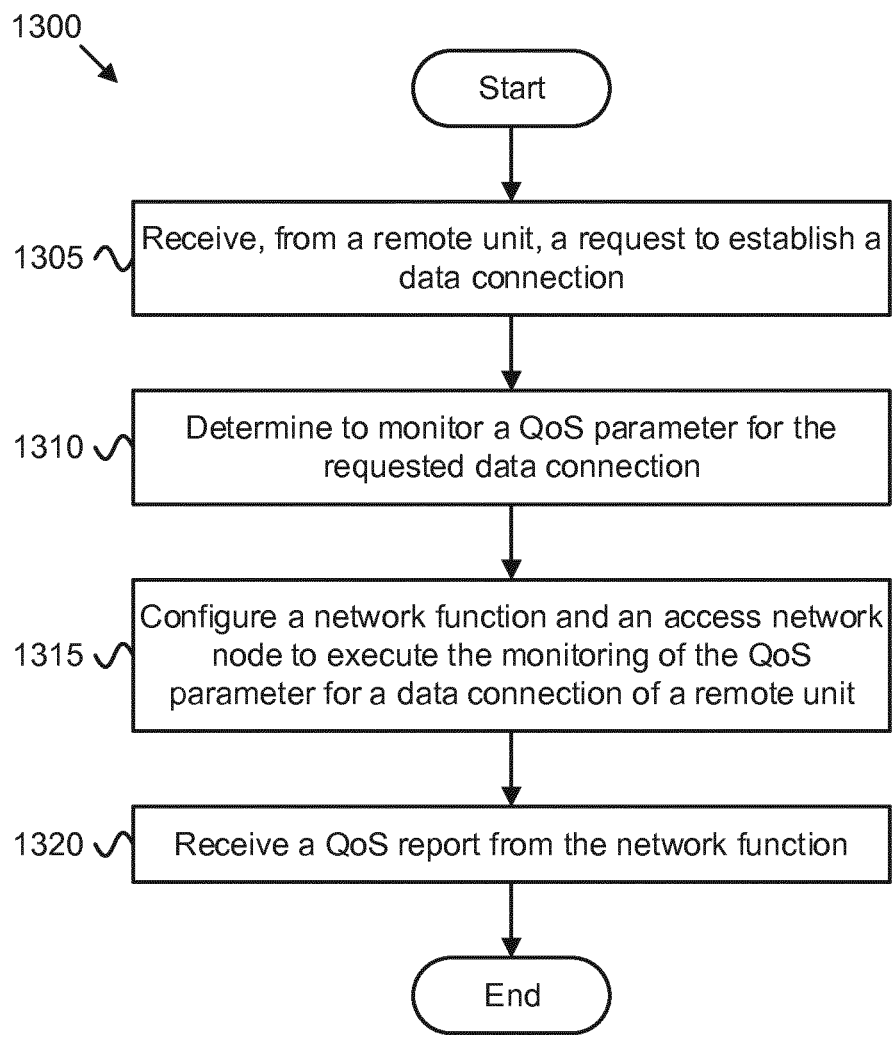
FIG. 13 is a flow chart diagram illustrating one embodiment of a third method for monitoring a QoS parameter.

FIG. 13 depicts a method 1300 for monitoring a QoS parameter, according to embodiments of the disclosure. In some embodiments, the method 1300 is performed by an apparatus, such as the SMF 143, the SMF 220, and/or the network equipment apparatus 400. In certain embodiments, the method 1300 may be performed by a processor executing program code, for example, a microcontroller, a microprocessor, a CPU, a GPU, an auxiliary processing unit, a FPGA, or the like.

The method 1300 begins with receiving 1305, from a remote unit, a request to establish a data connection. In certain embodiments, the request is a PDU Session Establishment request.

The method 1300 includes determining 1310 to monitor QoS parameter for the requested data connection. In some embodiments, the QoS parameter may be one or more of: an uplink packet delay budget, an uplink delay jitter, an uplink packet error rate, a downlink packet delay budget, a downlink delay jitter, and a downlink packet error rate. In some embodiments, determining 1310 to monitor the QoS parameter for the requested data connection may include one or more of: downloading subscription data of the remote unit, requesting policy rules for the requested data connection, and determining application level requirements.

The method 1300 includes configuring 1315 a network function and an access network node to execute the monitoring of the QoS parameter for the data connection of a remote unit. In some embodiments, configuring 1315 a network function and an access network node to monitor the QoS parameter for a data connection of a remote unit includes indicating whether to measure one of: an uplink QoS parameter and a downlink QoS parameter. In certain embodiments, configuring 1315 the network function and access network node to monitor the QoS parameter includes configuring a frequency (or pattern) for marking data packets, wherein the QoS parameter is measured using the marked data packets.

The method 1300 includes receiving a QoS report from the network function. The method 1300 ends.

Figure 14:
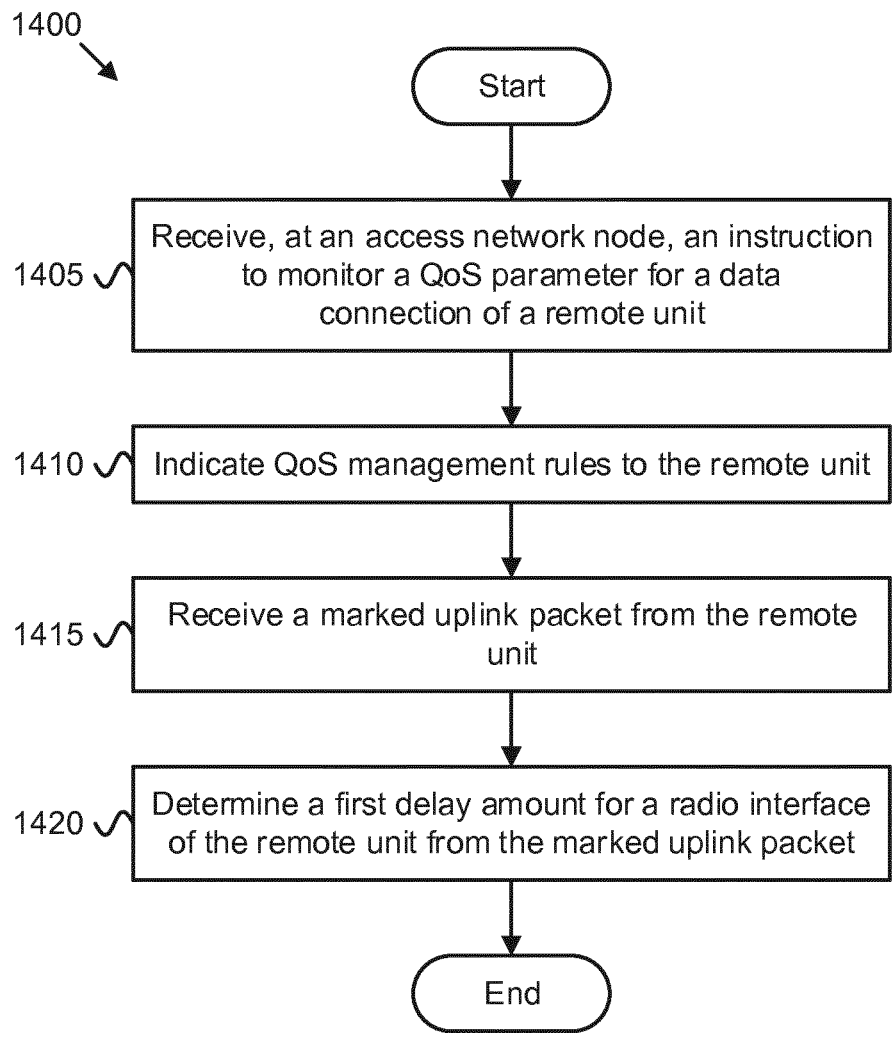
FIG. 14 is a flow chart diagram illustrating one embodiment of a fourth method for monitoring a QoS parameter.

FIG. 14 depicts a method 1400 for monitoring a QoS parameter, according to embodiments of the disclosure. In some embodiments, the method 1400 is performed by an apparatus, such as the base unit 110, the (R)AN node 210, and/or the access network apparatus 500. In certain embodiments, the method 1400 may be performed by a processor executing program code, for example, a microcontroller, a microprocessor, a CPU, a GPU, an auxiliary processing unit, a FPGA, or the like.

The method 1400 begins with receiving 1405, at the access network node, an instruction to monitor a QoS parameter for a data connection of a remote unit. In certain embodiments, the QoS parameter includes one of: an uplink packet delay budget, an uplink delay jitter, and an uplink packet error rate. In some embodiments, receiving 1405 the instruction to monitor the QoS parameter includes receiving a marking pattern. The method 1400 includes indicating 1410 QoS measurement rules to the remote unit.

The method 1400 includes receiving 1415, at the access network node, a marked uplink packet from the remote unit. In some embodiments, the marked uplink packet is received according to the marking pattern received from the session management function.

The method 1400 includes determining 1420 a first delay amount for a radio interface of the remote unit from the marked uplink packet. The method 1400 ends. In some embodiments, the marked uplink packet includes a time-stamp. In such embodiments, determining 1420 the first delay amount for a radio interface is based on the time-stamp. In one embodiment, the time-stamp is a global time-stamp. In another embodiment, the time-stamp indicates a system time.

Figure 15:
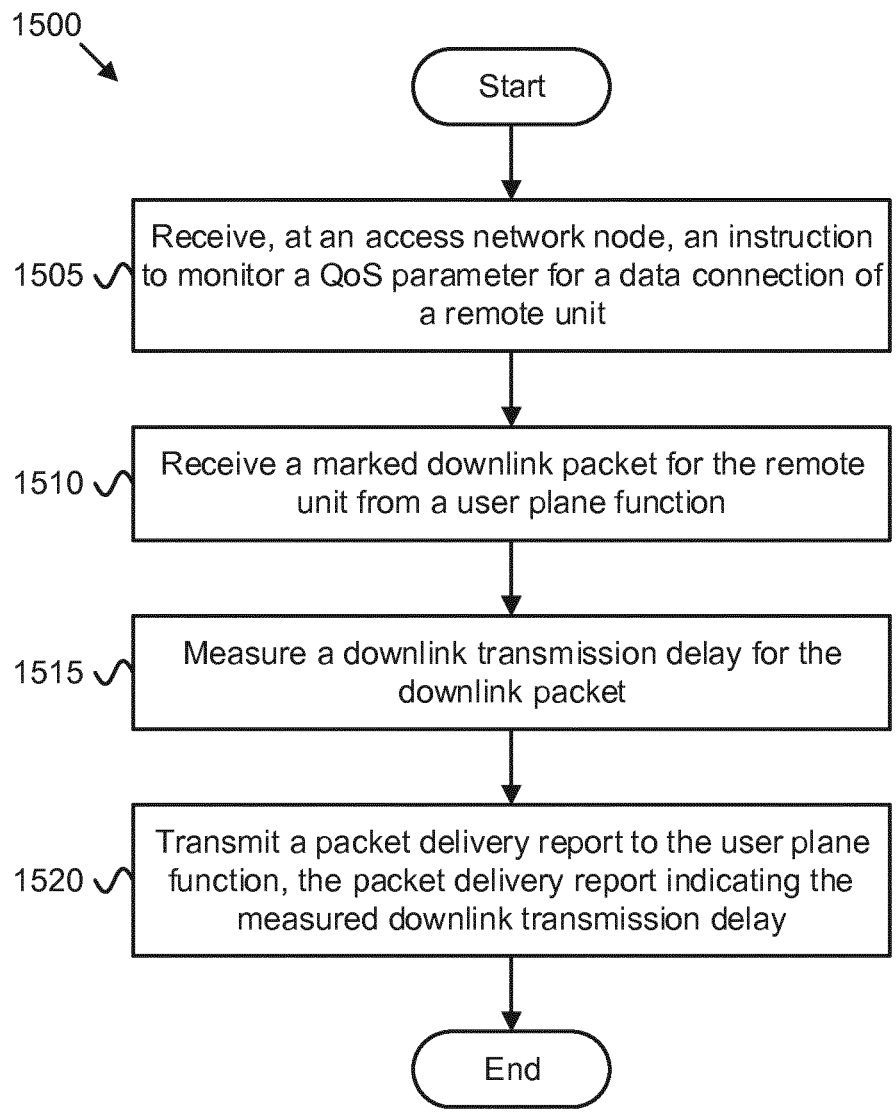
FIG. 15 is a flow chart diagram illustrating one embodiment of a fifth method for monitoring a QoS parameter.

FIG. 15 depicts a method 1500 for monitoring a QoS parameter, according to embodiments of the disclosure. In some embodiments, the method 1500 is performed by an apparatus, such as the base unit 110, the (R)AN node 210, and/or the access network apparatus 500. In certain embodiments, the method 1500 may be performed by a processor executing program code, for example, a microcontroller, a microprocessor, a CPU, a GPU, an auxiliary processing unit, a FPGA, or the like.

The method 1500 begins with receiving 1505, at an access network node, an instruction to monitor a QoS parameter for a data connection of a remote unit. In certain embodiments, the QoS parameter includes one of: a downlink packet delay budget, a downlink delay jitter, and a downlink packet error rate.

The method 1500 includes receiving 1510 a marked downlink packet for the remote unit from a user plane function. In some embodiments, the marked uplink packet includes a time-stamp. In one embodiment, the time-stamp is included in a PDCP header. In another embodiment, the time-stamp is included in a SDAP header.

The method 1500 includes measuring 1515 a downlink transmission delay for the downlink packet. The method 1500 includes transmitting 1520 a packet delivery report to the user plane function, the packet delivery report indicating the measured downlink transmission delay. The method 1500 ends.

In one embodiment, transmitting 1520 the packet delivery report to the user plane function includes appending the packet delivery report to an uplink data packet received from the remote unit. In another embodiment, transmitting 1520 the packet delivery report to the user plane function includes sending a GTP-U message to the user plane function. In certain embodiments, the packet delivery report is included in a GTP-U encapsulation header.

Figure 16:
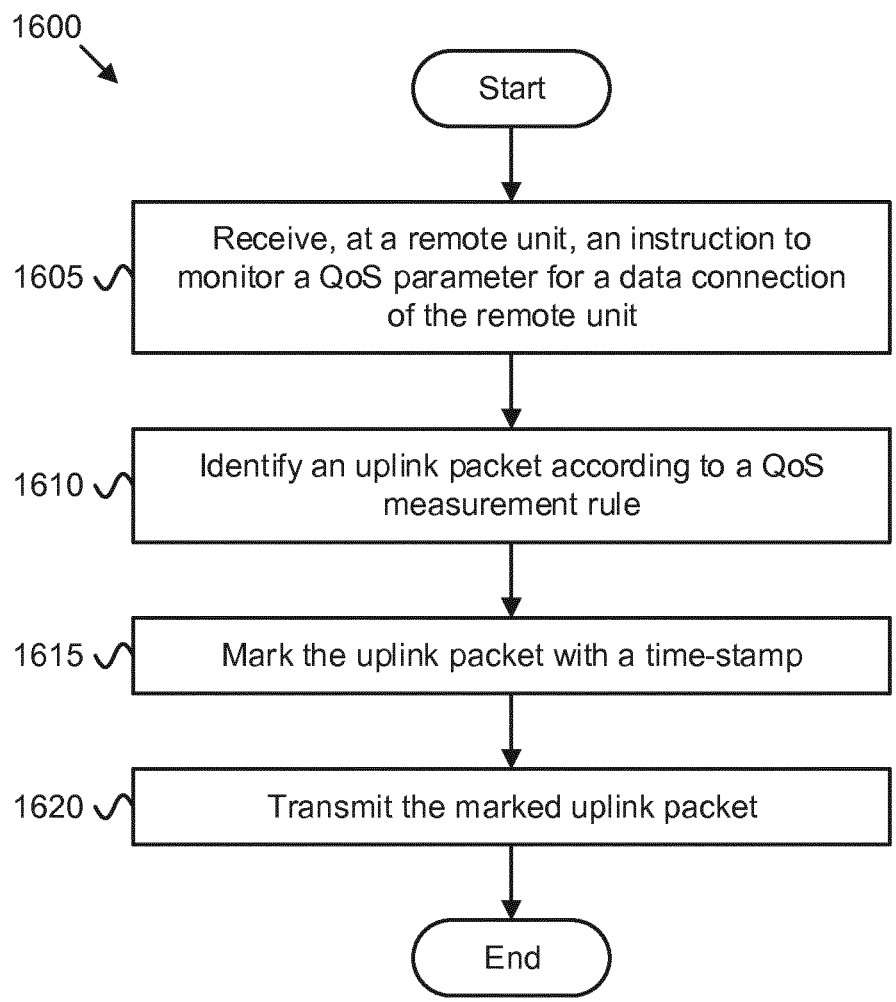
FIG. 16 is a flow chart diagram illustrating one embodiment of a sixth method for monitoring a QoS parameter.

FIG. 16 depicts a method 1600 for monitoring a QoS parameter, according to embodiments of the disclosure. In some embodiments, the method 1600 is performed by an apparatus, such as the remote unit 105, the UE 205, and/or the user equipment apparatus 300. In certain embodiments, the method 1600 may be performed by a processor executing program code, for example, a microcontroller, a microprocessor, a CPU, a GPU, an auxiliary processing unit, a FPGA, or the like.

The method 1600 begins with receiving 1605, at a remote unit, an instruction to monitor a QoS parameter for a data connection of the remote unit. In some embodiments, the instruction to monitor a QoS parameter may be received in a response message establishing the data connection. Here, the response message may be responsive to the remote unit requesting establishment of the data connection. In various embodiments, receiving the instruction to monitor the QoS parameter includes receiving a marking pattern.

The method 1600 includes identifying 1610 an uplink packet according to a QoS measurement rule. In some embodiments, the QoS measurement rule is received in a response message establishing the data connection.

The method 1600 includes marking 1615 the uplink packet with a time-stamp. In various embodiments, the time-stamp may be one of: a global time-stamp, a radio frame sequence number, and a subframe number. Where the instruction to monitor the QoS parameter indicates a marking pattern, then modifying the uplink packet occurs according to a frequency indicated by the marking pattern.

The method 1600 includes transmitting 1620 the marked uplink packet. The method 1600 ends.

Described herein is a first method for monitoring a QoS parameter. In one embodiment, the first method is performed by a user plane network function in a mobile communication network. The first method includes receiving an instruction to monitor a QoS parameter for a data connection of a remote unit and modifying a downlink packet to include an indication for a packet delivery report. The first method includes receiving a packet delivery report in response to delivery of the downlink packet to the remote unit and determining the QoS parameter based on delivery information of the downlink packet.

In various embodiments, receiving the instruction to monitor the QoS parameter includes receiving a marking pattern. In such embodiments, modifying the downlink packet occurs according to the marking pattern. In some embodiments, modifying the downlink packet to include the indication for a packet delivery report includes adding the indication to an encapsulation header of the downlink packet.

In some embodiments of the first method, the instruction to monitor the QoS parameter indicates at least a specific data connection and one or more QoS parameters to be monitored. In certain embodiments, indicating the specific data connection includes the instruction indicating a specific data flow associated with that data connection. In one embodiment, the specific data flow is a QoS flow. In another embodiment, the specific data flow is a bearer, such as an EPS bearer.

In some embodiments of the first method, receiving the packet delivery report includes receiving the packet delivery report from an access network node in a user plane path of the data connection. In one embodiment, the access network node sends the packet delivery report immediately after successful transmission of the downlink packet.

In certain embodiments, the first method further includes: sending the downlink packet to the access network node, initiating a timer in response to sending the downlink packet to the access network node, and stopping the timer in response to receipt of the packet delivery report. In one such embodiment, determining the QoS parameter is based on an amount of time measured by the timer.

In other embodiments, the first method further includes: sending the downlink packet to the access network node, recording a first local time when the downlink packet is send, and recording a second local time when the delivery report is received. In one such embodiment, determining the QoS parameter is based on a comparison of the recorded first and second local times.

In certain embodiments, the first method includes determining non-delivery of the downlink packet in response to expiry of the timer prior to receiving a packet delivery report for the downlink packet. In such embodiments, determining the QoS parameter may be based on the non-delivery of the downlink packet.

In certain embodiments of the first method, the instruction to monitor the QoS parameter is received from a session management function. Here, the first method may further include reporting the QoS parameter to the session management function. In such embodiments, the instruction to monitor the QoS parameter may indicate a specific type of QoS report format from a plurality of QoS report formats. In one embodiment, the QoS report may indicate a type and a location of a communication error, e.g., in the data connection.

In some embodiments, modifying the downlink packet includes adding a global time-stamp in the downlink packet, wherein the packet delivery report includes a downlink delay based on the global time-stamp. In various embodiments, the first method is used to measure one or more downlink QoS parameters, such as a downlink packet delay budget, a downlink delay jitter, and/or a downlink packet error rate.

Disclosed herein is a first apparatus for monitoring a QoS parameter. In one embodiment, the first apparatus is a user plane network function in a mobile communication network. The first apparatus includes a processor and a transceiver that communicates with a remote unit via an access network. The transceiver may also communicate with one or more network functions in the mobile communication network. The processor receives an instruction to monitor a QoS parameter for a data connection of the remote unit and modifies a downlink packet to include an indication for a packet delivery report. The processor also receives a packet delivery report (e.g., via the transceiver) in response to delivery of the downlink packet to the remote unit and determines the QoS parameter based on delivery information of the downlink packet.

In various embodiments, receiving the instruction to monitor the QoS parameter includes receiving a marking pattern. In such embodiments, modifying the downlink packet occurs according to the marking pattern. In some embodiments, modifying the downlink packet to include the indication for a packet delivery report includes adding the indication to an encapsulation header of the downlink packet.

In some embodiments, the instruction to monitor the QoS parameter indicates at least a specific data connection and one or more QoS parameters to be monitored. In certain embodiments, indicating the specific data connection includes the instruction indicating a specific data flow associated with that data connection. In one embodiment, the specific data flow is a QoS flow. In another embodiment, the specific data flow is a bearer, such as an EPS bearer.

In some embodiments, receiving the packet delivery report includes the transceiver receiving the packet delivery report from an access network node in a user plane path of the data connection. In one embodiment, the access network node sends the packet delivery report immediately after successful transmission of the downlink packet.

In certain embodiments of the first apparatus, the transceiver sends the downlink packet to the access network node, wherein the processor initiates a timer in response to sending the downlink packet to the access network node and stops the timer in response to receipt of the packet delivery report. In one such embodiment, the processor may determine the QoS parameter based on an amount of time measured by the timer.

In other embodiments of the first apparatus, the transceiver sends the downlink packet to the access network node, wherein the processor records a first local time when the downlink packet is send and records a second local time when the delivery report is received. In one such embodiment, the processor may determine the QoS parameter based on a comparison of the recorded first and second local times.

In certain embodiments of the first apparatus, the processor may determine non-delivery of the downlink packet, e.g., in response to expiry of the timer prior to receiving a packet delivery report for the downlink packet. In such embodiments, determining the QoS parameter may be based on the non-delivery of the downlink packet.

In certain embodiments of the first apparatus, the instruction to monitor the QoS parameter is received from a session management function. Here, the processor may report the QoS parameter to the session management function. In such embodiments, the instruction to monitor the QoS parameter may indicate a specific type of QoS report format from a plurality of QoS report formats. In one embodiment, the QoS report may indicate a type and a location of a communication error, e.g., in the data connection.

In some embodiments, modifying the downlink packet includes the processor adding a global time-stamp in the downlink packet, wherein the packet delivery report includes a downlink delay based on the global time-stamp. In various embodiments, the first apparatus is used to measure one or more downlink QoS parameters, such as a downlink packet delay budget, a downlink delay jitter, and/or a downlink packet error rate.

Disclosed herein is a second method for monitoring a QoS parameter. In various embodiments, the second method may be performed by a user plane function in a mobile communication network. The second method includes receiving an instruction to monitor a QoS parameter for a data connection of a remote unit and receiving an indication of a first delay amount for a packet over a radio interface of the remote unit. The second method includes determining a second delay amount for the data connection and determining the QoS parameter based on the first and second delay amounts.

In certain embodiments of the second method, receiving the instruction to monitor the QoS parameter includes receiving a target value for the QoS parameter. In such embodiments, determining the QoS parameter may include comparing a measured value of the QoS parameter to the target value. In various embodiments, determining the QoS parameter based on the first and second delay amounts includes determining an amount of delay based on a time-stamped uplink packet.

In some embodiments of the second method, the instruction to monitor the QoS parameter indicates at least a specific data connection and one or more QoS parameters to be monitored. In certain embodiments, indicating the specific data connection includes the instruction indicating a specific data flow associated with that data connection. In one embodiment, the specific data flow is a QoS flow. In another embodiment, the specific data flow is a bearer, such as an EPS bearer.

In some embodiments, determining the second delay amount includes sending a GTP-U echo request message to an access network node in a user plane path of the data connection. In certain embodiments, the indication of a first delay amount is received at a first periodicity and the GTP-U echo request is sent according to a second periodicity that is greater than the first periodicity. In one embodiment, the first periodicity may be indicated by a marking pattern received with the instruction to measure the QoS parameter. In certain embodiments, determining the second delay amount occurs in response to a measured packet delay budget exceeding a target packet delay budget.

In some embodiments, receiving the indication of a first delay amount includes receiving an uplink radio transmission delay time in an uplink packet header. In certain embodiments, the second delay includes the delay of an access-network-to-core-network path. In one embodiment, the access-network-to-core-network path comprises an N3 user place interface. In certain embodiments, the second delay includes the delay of an intra-core-network path. In one embodiment, the intra-core-network comprises an N9 interface.

In various embodiments, the QoS parameter includes one of: an uplink packet delay budget, an uplink delay jitter, and an uplink packet error rate. In some embodiments, the second method further includes measuring a downlink QoS parameter independently of the first and second delay amounts.

Disclosed herein is a second apparatus for monitoring a QoS parameter. In various embodiments, the second method may be a user plane function in a mobile communication network. The second method includes a processor and a transceiver that communicates with a remote unit via an access network. The transceiver may also communicate with one or more network functions in the mobile communication network. The transceiver receives an instruction to monitor a QoS parameter for a data connection of a remote unit and receives an indication of a first delay amount for a packet over a radio interface of the remote unit. The processor determines a second delay amount for the data connection and determines the QoS parameter based on the first and second delay amounts.

In certain embodiments of the second apparatus, receiving the instruction to monitor the QoS parameter includes the processor receiving a target value for the QoS parameter. In such embodiments, determining the QoS parameter may include the processor comparing a measured value of the QoS parameter to the target value. In various embodiments, determining the QoS parameter based on the first and second delay amounts includes determining an amount of delay based on a time-stamped uplink packet.

In some embodiments of the second apparatus, the instruction to monitor the QoS parameter indicates at least a specific data connection and one or more QoS parameters to be monitored. In certain embodiments, indicating the specific data connection includes the instruction indicating a specific data flow associated with that data connection. In one embodiment, the specific data flow is a QoS flow. In another embodiment, the specific data flow is a bearer, such as an EPS bearer.

In some embodiments, determining the second delay amount includes the transceiver sending a GTP-U echo request message to an access network node in a user plane path of the data connection. In certain embodiments, the indication of a first delay amount is received at a first periodicity and the GTP-U echo request is sent according to a second periodicity that is greater than the first periodicity. In one embodiment, the first periodicity may be indicated by a marking pattern received with the instruction to measure the QoS parameter. In certain embodiments, determining the second delay amount occurs in response to a measured packet delay budget exceeding a target packet delay budget.

In some embodiments, receiving the indication of a first delay amount includes receiving an uplink radio transmission delay time in an uplink packet header. In certain embodiments, the second delay amount includes the delay amount of an access-network-to-core-network path. In one embodiment, the access-network-to-core-network path comprises an N3 user place interface. In certain embodiments, the second delay amount includes the delay amount of an intra-core-network path. In one embodiment, the intra-core-network comprises an N9 interface.

In various embodiments, the QoS parameter includes one of: an uplink packet delay budget, an uplink delay jitter, and an uplink packet error rate. In some embodiments of the second apparatus, the processor further measures a downlink QoS parameter independently of the first and second delay amounts.

Disclosed herein is a third method for monitoring a QoS parameter. In one embodiment, the third method is performed by a session management function in a mobile communication network. The third method includes receiving, from a remote unit a request to establish a data connection and determining to monitor QoS parameter for the requested data connection. The third method includes configuring a network function and an access network node to execute the monitoring of the QoS parameter for the data connection of a remote unit and receiving a QoS report from the network function.

In various embodiments, the third method includes detecting a changed QoS condition based on the QoS report and performing one of: QoS flow modification, identifying new QoS policy rules, and informing an application server of the changed QoS condition. Moreover, the QoS parameter may be one or more of: an uplink packet delay budget, an uplink delay jitter, an uplink packet error rate, a downlink packet delay budget, a downlink delay jitter, and a downlink packet error rate.

In some embodiments of the third method, configuring a network function and an access network node to monitor the QoS parameter for a data connection of a remote unit includes indicating whether to measure one of: an uplink QoS parameter and a downlink QoS parameter. In certain embodiments, the third method may further include receiving an indication from the remote unit as to whether the remote unit is capable of monitoring the uplink QoS parameter. In further embodiments, the third method may include configuring the remote unit to execute the monitoring of the QoS parameter for the requested data connection.

In some embodiments, determining to monitor the QoS parameter for the requested data connection may include one or more of: downloading subscription data of the remote unit, requesting policy rules for the requested data connection, and determining application level requirements. In certain embodiments, configuring the network function and access network node to monitor the QoS parameter includes configuring a frequency for marking data packets, wherein the QoS parameter is measured using the marked data packets.

Disclosed herein is a third apparatus for monitoring a QoS parameter of a data connection. The third apparatus may be a session management function in a mobile communication network. The third apparatus includes a processor and a transceiver that communicates with one or more nodes in the mobile communication network. The transceiver receives, from a remote unit a request to establish a data connection and the processor determines to monitor QoS parameter for the requested data connection. The processor configures a network function and an access network node to execute the monitoring of the QoS parameter for the data connection of a remote unit and the transceiver receives a QoS report from the configured network function.

In various embodiments of the third apparatus, the processor detects a changed QoS condition based on the QoS report and performs one of: QoS flow modification, identifying new QoS policy rules, and informing an application server of the changed QoS condition. Moreover, the QoS parameter may be one or more of: an uplink packet delay budget, an uplink delay jitter, an uplink packet error rate, a downlink packet delay budget, a downlink delay jitter, and a downlink packet error rate.

In some embodiments of the third method, configuring a network function and an access network node to monitor the QoS parameter for a data connection of a remote unit includes indicating whether to measure one of: an uplink QoS parameter and a downlink QoS parameter. In certain embodiments, the transceiver may receive an indication from the remote unit as to whether the remote unit is capable of monitoring the uplink QoS parameter. In further embodiments, the processor may configure the remote unit to execute the monitoring of the QoS parameter for the requested data connection.

In some embodiments, determining to monitor the QoS parameter for the requested data connection may include one or more of: downloading subscription data of the remote unit, requesting policy rules for the requested data connection, and determining application level requirements. In certain embodiments, configuring the network function and access network node to monitor the QoS parameter includes configuring a frequency for marking data packets, wherein the QoS parameter is measured using the marked data packets.

Disclosed herein is a fourth method for monitoring a QoS parameter. In one embodiment, the fourth method is performed by access network node of a mobile communication network. The fourth method includes receiving, at the access network node, an instruction to monitor a QoS parameter for a data connection of a remote unit and indicating QoS measurement rules to the remote unit. The fourth method includes receiving, at the access network node, a marked uplink packet from the remote unit and determining a first delay amount for a radio interface of the remote unit from the marked uplink packet.

In various embodiments, the fourth method includes reporting the first delay amount to a user plane function in a user plane path of the data connection. In some embodiments, the marked uplink packet includes a time-stamp. In such embodiments, determining the first delay amount for a radio interface is based on the time-stamp. In certain embodiments, the time-stamp is a global time-stamp. In such embodiments, the fourth method includes forwarding the global time-stamp to a user plane function in a user plane path of the data connection. In other embodiments, the time-stamp is a system time of the access network node. In such embodiments, the system time may be one of: a radio frame sequence number and a subframe number.

In some embodiments, receiving the instruction to monitor the QoS parameter includes receiving a marking pattern. In such embodiments, the marked uplink packet is received according to the marking pattern. In various embodiments, the QoS parameter includes one of: an uplink packet delay budget, an uplink delay jitter, and an uplink packet error rate.

Disclosed herein is a fourth apparatus for monitoring a QoS parameter of a data connection. The fourth apparatus may be an access network node in a mobile communication network. The fourth apparatus includes a processor, a first transceiver that communicates with a remote unit, and a second transceiver that communicates with one or more functions in the mobile communication network. The processor receives (e.g., via the second transceiver) an instruction to monitor a QoS parameter for a data connection of a remote unit and indicates QoS measurement rules to the remote unit (e.g., via the first transceiver). The processor receives (e.g., via the first transceiver) a marked uplink packet from the remote unit and determines a first delay amount for a radio interface of the remote unit from the marked uplink packet.

In some embodiments, the marked uplink packet includes a time-stamp. In such embodiments, the processor determines the first delay amount for a radio interface based on the time-stamp. In certain embodiments, the time-stamp is a global time-stamp. In such embodiments, the processor forwards (e.g., via the second transceiver) the global time-stamp to a user plane function in a user plane path of the data connection. In other embodiments, the time-stamp is a system time of the access network node. In such embodiments, the system time may be one of: a radio frame sequence number and a subframe number.

In some embodiments, receiving the instruction to monitor the QoS parameter includes receiving a marking pattern. In such embodiments, the marked uplink packet is received according to the marking pattern. In various embodiments, the QoS parameter includes one of: an uplink packet delay budget, an uplink delay jitter, and an uplink packet error rate.

Disclosed is a fifth method for monitoring a QoS parameter. In various embodiments, the fifth method may be performed by an access network node. The fifth method includes receiving, at an access network node, an instruction to monitor a QoS parameter for a data connection of a remote unit and receiving a marked downlink packet for the remote unit from a user plane function. The fifth method includes measuring a downlink transmission delay for the downlink packet and transmitting a packet delivery report to the user plane function, the packet delivery report indicating the measured downlink transmission delay.

In some embodiments, the marked uplink packet includes a time-stamp, the method further including transmitting the time-stamp in one of: a PDCP header and a SDAP header. In certain embodiments, the time-stamp is a global time-stamp. In various embodiments, the QoS parameter includes one of: a downlink packet delay budget, a downlink delay jitter, and a downlink packet error rate.

In one embodiment, transmitting the packet delivery report to the user plane function includes appending the packet delivery report to an uplink data packet received from the remote unit. In another embodiment, transmitting the packet delivery report to the user plane function includes sending a GTP-U message to the user plane function. In certain embodiments, the packet delivery report is included in a GTP-U encapsulation header.

Disclosed is a fifth apparatus for monitoring a QoS parameter. In various embodiments, the fifth apparatus may be an access network node. The fifth apparatus includes a processor, a first transceiver that communicates with one or more functions in the mobile communication network, and a second transceiver that communicates with a remote unit. The processor receives (e.g., via the first transceiver) an instruction to monitor a QoS parameter for a data connection of a remote unit and receives (e.g., via the first transceiver) a marked downlink packet for the remote unit from a user plane function. The processor measures a downlink transmission delay for the downlink packet and transmits (e.g., via the first transceiver) a packet delivery report to the user plane function, the packet delivery report indicating the measured downlink transmission delay.

In some embodiments, the marked uplink packet includes a time-stamp, the method further including transmitting the time-stamp in one of: a PDCP header and a SDAP header. In certain embodiments, the time-stamp is a global time-stamp. In various embodiments, the QoS parameter includes one of: a downlink packet delay budget, a downlink delay jitter, and a downlink packet error rate.

In one embodiment, transmitting the packet delivery report to the user plane function includes appending the packet delivery report to an uplink data packet received from the remote unit. In another embodiment, transmitting the packet delivery report to the user plane function includes sending a GTP-U message to the user plane function. In certain embodiments, the packet delivery report is included in a GTP-U encapsulation header.

Disclosed is a sixth method for monitoring a QoS parameter. In various embodiments, the fifth method may be performed by remote unit, such as a UE. The sixth method includes receiving, at a remote unit, an instruction to monitor a QoS parameter for a data connection of the remote unit and identifying an uplink packet according to a QoS measurement rule. The sixth method includes marking the uplink packet with a time-stamp and transmitting the marked uplink packet.

In various embodiments, the time-stamp may be one of: a global time-stamp, a radio frame sequence number, and a subframe number. In some embodiments, the sixth method includes receiving a time-stamped downlink packet and calculating a downlink delay based on the time-stamped downlink packet. Moreover, the sixth method may include transmitting the downlink delay in a QoS monitoring report.

In one embodiment, transmitting the downlink delay in a QoS monitoring report occurs according to a configured periodicity. In some embodiments, receiving the instruction to monitor the QoS parameter includes receiving a marking pattern, wherein modifying the uplink packet occurs according to a frequency indicated by the marking pattern.

In some embodiments, the sixth method includes requesting the data connection prior to receiving the instruction to monitor a QoS parameter. In such embodiments, the instruction to monitor a QoS parameter may be received in a response message establishing the data connection. In one embodiment, requesting the data connection includes sending a PDU Session Establishment Request message, wherein the instruction to monitor a QoS parameter is included in a PDU Session Establishment Accept message. In further embodiments, the response message establishing the data connection may include one or more QoS measurement rules.

Disclosed is a sixth apparatus for monitoring a QoS parameter. In various embodiments, the sixth apparatus may be a remote unit, such as a UE. The sixth apparatus includes a processor and a transceiver that communicates with a mobile communication network, e.g., via an access network. The processor receives (e.g., via the transceiver) an instruction to monitor a QoS parameter for a data connection of the remote unit and identifies an uplink packet according to a QoS measurement rule. The processor marks the uplink packet with a time-stamp and transmits (e.g., via the transceiver) the marked uplink packet.

In various embodiments, the time-stamp may be one of: a global time-stamp, a radio frame sequence number, and a subframe number. In some embodiments, the processor receives (e.g., via the transceiver) a time-stamped downlink packet and calculates a downlink delay based on the time-stamped downlink packet. Moreover, the processor may transmit (e.g., via the transceiver) the downlink delay in a QoS monitoring report. In one embodiment, transmitting the downlink delay in a QoS monitoring report occurs according to a configured periodicity. In some embodiments, receiving the instruction to monitor the QoS parameter includes receiving a marking pattern, wherein modifying the uplink packet occurs according to a frequency indicated by the marking pattern.

In some embodiments, the processor requests the data connection prior to receiving the instruction to monitor a QoS parameter. In such embodiments, the instruction to monitor a QoS parameter may be received in a response message establishing the data connection. In one embodiment, requesting the data connection includes sending a PDU Session Establishment Request message, wherein the instruction to monitor a QoS parameter is included in a PDU Session Establishment Accept message. In further embodiments, the response message establishing the data connection may include one or more QoS measurement rules.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a user plane function ("UPF"),
the apparatus comprising:
at least one memory; and
at least one processor coupled with the at least one memory and configured to cause the UPF to:
receive a request to monitor a quality of service ("QoS") parameter for a data connection of a user equipment ("UE"), wherein the QoS parameter is associated with a packet delay measurement;
modify a downlink packet to include an indication for a QoS monitoring report;
receive a QoS monitoring result from an access network node in response to the modified downlink packet; and
determine a value of the QoS parameter based on an amount of time expired between a transmission of the modified downlink packet and a reception of the QoS monitoring result, and a subtraction of one half of a delay between the access network node and the UPF.

2. The apparatus of claim 1, wherein the request to monitor the QoS parameter indicates a reporting frequency, and wherein the at least one processor is configured to cause the UPF to modify the downlink packet according to the reporting frequency.

3. The apparatus of claim 1, wherein the request to monitor the QoS parameter indicates a QoS flow identity and a packet delay budget parameter between the UPF and the UE.

4. The apparatus of claim 1, wherein to modify the downlink packet to include the indication for the QoS monitoring report, the at least one processor is configured to cause the UPF to add the indication to an encapsulation header of the downlink packet.

5. The apparatus of claim 1, wherein the QoS monitoring result comprises one or more measurements of a respective packet delay of a radio link between the UE and the access network node.

6. The apparatus of claim 1, wherein to determine the value of the QoS parameter, the at least one processor is configured to cause the UPF to:
record a first time when the modified downlink packet is sent to the access network node;
record a second time when the QoS monitoring result is received at the UPF; and
calculate a measured value of the QoS parameter between the UPF and the UE based on a time difference between the first time and the second time.

7. The apparatus of claim 1, wherein the request to monitor the QoS parameter is received from a session management function "SMF"), and wherein the at least one processor is configured to cause the UPF to report value of the QoS parameter to the SMF.

8. The apparatus of claim 7, wherein the request to monitor the QoS parameter indicates a specific type of QoS report format from a plurality of QoS report formats.

9. The apparatus of claim 1, wherein the QoS parameter comprises one or more of: an uplink packet delay budget, a downlink packet delay budget, an uplink delay jitter, a downlink delay jitter, an uplink packet error rate, or a downlink packet error rate, or a combination thereof.

10. An apparatus comprising a session management function ("SMF"), the apparatus comprising:
at least one memory; and at least one processor coupled with the at least one memory and configured to cause the SMF to:
transmit to a user plane function ("UPF") a first request to monitor a quality of service ("QoS") parameter for a data connection of a user equipment ("UE"), wherein the first request indicates a frequency or a pattern for modifying a downlink packet;
transmit to an access network node a second request to monitor the QoS parameter for the data connection based on a reception of the downlink packet, wherein the UPF and the access network node are part of a user plane path of the data connection; and
receive a determined value of the QoS parameter from the UPF, wherein the determined value of the QoS parameter is based on an amount of time expired between a transmission of the downlink packet and a reception of a packet delivery result associated with the downlink packet, and a subtraction of one half of a delay between the access network node and the UPF.

11. The apparatus of claim 10, wherein the first and second requests to monitor the QoS parameter indicates a QoS flow identity and a packet delay budget parameter.

12. The apparatus of claim 10, wherein the QoS parameter comprises one or more of: an uplink packet delay budget, a downlink packet delay budget, an uplink delay jitter, a downlink delay jitter, an uplink packet error rate, or a downlink packet error rate, or a combination thereof.

13. The apparatus of claim 10, wherein the first request to monitor the QoS parameter indicates a specific type of QoS report format from a plurality of QoS report formats, and wherein the at least one processor is configured to cause the SMF to modify a QoS flow of the data connection based on a monitoring report.

14. A base station for wireless communication, comprising:
receive a request to monitor a quality of service ("QoS") parameter for a data connection of a user equipment ("UE");
receive a marked downlink packet for the UE from a user plane function ("UPF"), wherein the marked downlink packet comprises an indication for a packet delivery report;
transmit downlink user data to the UE based on the marked downlink packet;
receive an acknowledgement of the downlink user data from the UE;
measure an access network transmission delay for the downlink user data in response to the marked downlink packet; and
transmit the packet delivery report to the UPF in response to the acknowledgement, the packet delivery report indicating the measured access network transmission delay.

15. The base station of claim 14, wherein the request to monitor the QoS parameter comprises a reporting frequency, wherein the marked downlink packet occurs according to the reporting frequency.

16. The base station of claim 14, wherein the request to monitor the QoS parameter indicates a QoS flow identity and a packet delay budget parameter.

17. The base station of claim 14, wherein the marked downlink packet includes the indication for a QoS monitoring report in an encapsulation header of the marked downlink packet.

18. The base station of claim 17, wherein the QoS monitoring report includes one or more measurements of a packet delay of a radio link between the UE and the base station.

19. The base station of claim 14, wherein the request to monitor the QoS parameter is received from a session management function ("SMF"), and wherein the QoS parameter comprises one or more of: an uplink packet delay budget, a downlink packet delay budget, an uplink delay jitter, a downlink delay jitter, an uplink packet error rate, or a downlink packet error rate, or a combination thereof.

20. A system comprising:
a session management function node ("SMF") that:
sends to a user plane function node ("UPF") a first request to monitor a quality of service ("QoS") parameter for a data connection of a user equipment ("UE"), and
sends to an access network node a second request to monitor the QoS parameter for the data connection, the UPF and access network node being part of a user plane path of the data connection;
wherein the UPF modifies a downlink packet to include an indication for a QoS monitoring report;
wherein the access network node measures an access network transmission delay and sends a QoS monitoring result to the UPF in response to the modified downlink packet, the QoS monitoring result indicating the measured access network transmission delay; and
wherein the UPF determines a value of the QoS parameter based on delivery information of the downlink packet and sends the determined value of the QoS parameter to the SMF, wherein the value of the QoS parameter is further based on an amount of time expired between a transmission of the modified downlink packet and a reception of the QoS monitoring result, and a subtraction of one half of a delay between the access network node and the UPF.

* * * * *